United States Patent
Percec et al.

(10) Patent No.: US 6,838,535 B2
(45) Date of Patent: Jan. 4, 2005

(54) PROCESS FOR THE LIVING RADICAL POLYMERIZATION OF CHLORINE CONTAINING MONOMERS

(75) Inventors: Virgil Percec, Philadelphia, PA (US); Alex Asandei, Philadelphia, PA (US)

(73) Assignee: University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/893,201

(22) Filed: Jun. 27, 2001

(65) Prior Publication Data

US 2002/0173611 A1 Nov. 21, 2002

Related U.S. Application Data

(60) Provisional application No. 60/278,114, filed on Mar. 23, 2001.

(51) Int. Cl.[7] ............................. C08F 4/44; C08F 114/06; C08F 114/08
(52) U.S. Cl. ..................... 526/161; 526/172; 526/343; 526/344
(58) Field of Search ..................... 526/344, 159, 526/160, 343, 161, 172

(56) References Cited

U.S. PATENT DOCUMENTS

| | | |
|---|---|---|
| 2,996,470 A | 8/1961 | Cole et al. |
| 4,091,197 A | 5/1978 | Fischer et al. |
| 4,511,700 A | 4/1985 | Melby et al. |
| 5,455,319 A | 10/1995 | Bak et al. |
| 5,763,548 A | 6/1998 | Matyjaszewski et al. |
| 5,789,487 A | 8/1998 | Matyjaszewski et al. |
| 5,807,937 A | 9/1998 | Matyjaszewski et al. |
| 6,162,882 A | 12/2000 | Matyjaszewski et al. |

FOREIGN PATENT DOCUMENTS

| | | | |
|---|---|---|---|
| EP | 1 016 678 | | 7/2000 |
| GB | 932 852 | | 7/1963 |
| GB | 961 940 | | 6/1964 |
| GB | 1 078 870 | | 8/1967 |
| JP | 10 130306 | | 5/1938 |
| JP | 10130306 | * | 5/1998 |
| WO | WO 96 30421 A | | 10/1996 |
| WO | WO 97 18247 A | | 5/1997 |
| WO | WO 97/18247 | * | 5/1997 |

* cited by examiner

*Primary Examiner*—Robert Deshon Harlan
(74) *Attorney, Agent, or Firm*—Michele M. Tyrpak; Hudak, Shunk & Farine Co., LPA

(57) ABSTRACT

A process for the preparation of polyvinyl chloride (PVC) with controlled molecular weight and molecular weight distribution is disclosed. The polymerization reaction can be initiated by various organic halide initiators in conjunction with a metal catalyst and an optional ligand in organic solvents or water and in the presence of an optional comonomer. The polymerization process provides PVC with a controlled molecular weight and narrow molecular weight distribution. The chlorine containing polymers compositions are useful as, among others, viscosity modifiers, impact modifiers and compatibilizers.

34 Claims, 4 Drawing Sheets

PROCESS FOR THE LIVING RADICAL POLYMERIZATION OF CHLORINE CONTAINING MONOMERS

CROSS REFERENCE

This application claims priority from prior provisional U.S. Application Ser. No. 60/278,114 filed Mar. 23, 2001.

BACKGROUND OF THE INVENTION

1. Field of the Invention

The present invention relates to the metal-catalyzed radical and living radical polymerization of chlorine-containing monomers such as vinyl chloride and vinyl halides. In particular, this invention relates to a process for the synthesis, in the presence of a catalyst, of poly (vinylchloride) (PVC) with controlled molecular weight and narrow molecular weight distribution. The polymerization can be initiated from various mono, di, and tri and polyfunctional, activated halide-containing initiators such as α,α-dihaloalkanes, α,α,α-trihaloalkanes, perhaloalkanes, perfloroalkyl halides, benzyl halides, allyl halides, sulfonyl halides, α-haloesters, α-halonitriles, α-haloketones, imidyl halides, or combinations thereof, in the presence of metal-based catalysts.

2. Description of the Prior Art

Heretofore, it was known to polymerize vinyl chloride (VC) and other vinyl halide monomers using conventional free radical processes. In a free radical polymerization the molecular weight is independent of conversion and the final molecular weight is already observed at conversions of about 5%. In this type of chain polymerization, in addition to propagation, the growing chain is involved in several other reactions such as chain transfer to monomer, solvent or initiator as well as bimolecular termination. As a consequence, even in the presence of certain additives for molecular weight control, the concentration of the growing species is not constant throughout the polymerization and the polydispersity is usually 2 or more, while the molecular weight distribution has a Gaussian distribution. In addition, PVC synthesized by free radical polymerization contains allyl and tertiary chlorines that are responsible for the low thermal stability of commercial PVC which requires thermal stabilizers for its practical use.

Heretofore, it has not been known to prepare poly(vinyl chloride) by a metal-catalyzed living radical process initiated from an active halide compound in which the molecular weight and the molecular weight distribution of PVC could be controlled. Living polymerizations are chain polymerization reactions in which the concentration of the growing species is approximately constant throughout the polymerization process. This is a consequence of the absence or low extent of transfer or termination reactions. A living polymerization is demonstrated by a linear increase of the polymer molecular weight with conversion. In addition, if the rate of initiation is larger than the rate of propagation, in a living polymerization the polydispersity decreases with conversion and approaches Mw/Mn=1+1/DP where DP=degree of polymerization (i.e. Poisson distribution). However, if the rate of initiation is slower than the rate of propagation the molecular weight distribution is Mw/Mn=2.

Previous attempts at metal-catalyzed radical polymerizations of vinyl chloride have resulted only in low molecular weight PVC oligomers called telomers. This low molecular weight poly(vinyl chloride) is allegedly formed by a free radical telomerization reaction by reacting the unsaturated vinyl monomer (vinyl chloride, taxogen) in the presence of an initiator with an AB molecule (telogen). However, such telomerization reactions generated only low molecular weight oligomers A—$(M_n)$—B where n<10 and the chain ends were derived from the telogen. Additionally, in these free radical telomerizations of vinyl chloride, the growing chains were irreversibly terminated by chain transfer to the telogen at low degrees of polymerization.

The metal catalyzed free radical telomerization of vinyl chloride (VC) initiated by redox systems based on certain haloalkanes and metals or metal complexes leads predominantly to low molecular weight species (DP=1 to 4 where DP=degree of polymerization) containing chain ends derived from the telogen. Such telomerizations were previously performed (see for example Freidlina, R. Kh.; Chukovskaya, E. C. *Synthesis* 1974, 477 and Freidlina, R. Kh.; Chukovskaya, E. C. *Synthesis* 1977, 145) using $CCl_4$ as alkyl halide telogen and $FeCl_2$, $FeCl_3$, $Fe(CO)_5$ (DP=1–3 and 10 to 30), CuCl, $CuCl_2$ (DP=1–3), $CrCl_3$, Fe(0), Cu(0) (DP<10) Ni(0), Mg(0), and Zn(0) as catalysts in the presence of alcohols or amines. $Fe(CO)_5$ was also used as catalyst for other telogens such as $FSO_2Cl$ (DP=1–3), $CHBr_3$ (DP=1–2), $PhCH_2Cl$ (DP=1–4), $CH_2Br_2$ (DP=1–2), ethyltrichloroacetate, methyldibromoacetate and dichloroacetoacetate, diethyldichloromalonate, $CHI_3$, (DP=1–2), as well as polyhaloalkanes such as: $CCl_3$—$CH_3$, $CCl_3$—$CHCl_2$, $CCl_3$—$CH_2$—$CH_2Cl$ and $CCl_3$—$(CH_2)_3$—$CH_2Cl$ (DP=1–2). Metal carbonyls such as $Cr(CO)_6$, $Mn_2(CO)_{10}$, $Mo(CO)_6$ and $W(CO)_6$ were also used as catalysts in the presence of $CBr_4$ as telogen (DP=1–2). $CCl_4$ was also used as telogen/chain transfer agent in VC polymerizations mediated by $AlEt_3$, $AlEt_3$/chloranil, $AlEt_3$/CuCl, $Et_2AlCl$/Ti $(OBu)_4$, various Al alkyls and trialkylboron. Arylmethyl chlorides and bromides were also tested as initiators in the presence of Ag(0) or Hg(0).

Fractionation of telomers synthesized using $CCl_4$ and $FeCl_2$ has revealed that telomers of the structure $CCl_3$($CH_2$—$CHCl)_n Cl$ were mobile liquids for n=1 to 3, viscous liquids for n=4 to 7 and solids for n>8. Only few other viscosimetric and gel permeation chromatography (GPC) data are available in the literature for fractionated telomers with DP=3–16 synthesized in the presence of a metal catalyst.

The radical polymerization of vinyl chloride is characterized by one of the largest values of the chain transfer constant to monomer ($C_M$) from all conventional monomers. At 60° C., the value $C_M$ for VC ($C_{VC}$=1.08–1.6×10$^{-3}$) is three to two orders of magnitude larger than for methyl methacrylate (MMA) ($C_{MMA}$=7×10$^{-6}$–2.5×10$^{-5}$) and two orders of magnitude larger than for styrene (St) ($C_{St}$=3–6× 10$^{-5}$). Therefore, due to the chain transfer to monomer process, the maximum molecular weight that can be obtained in the free radical polymerization of vinyl chloride is effectively limited and controlled by the reaction temperature (i.e. molecular weight decreases with increasing the reaction temperature). In the presence of additional chain transfer agents such as telogens or any other chain transfer agents, the molecular weight will be even lower than in the free radical polymerization. For example, the theoretical maximum molecular weight that can be obtained by free radical polymerization of VC at 90° C. is approximately 17,000, while at 130° C. the maximum molecular weight is 6,000. In addition, the values of the rate constants of propagation ($k_p$) and termination ($k_t$) for VC are two orders of magnitude larger than for MMA and St [$k_{p,VC}$=1.1×10$^4$ L·mol$^{-1}$·s$^{-1}$ (50° C.), $k_{p,MMA}$=5.15×10$^2$ L·mol$^{-1}$·s$^{-1}$ (60° C.), $k_{p,St}$=1.65×10$^2$ L·mol$^{-1}$·s$^{-1}$ (60° C.) and $k_{t,VC}$=2.1×10$^9$ L·mol$^{-1}$·s$^{-1}$ (50° C.), $k_{t,MMA}$=2.55×10$^7$ L·mol$^{-1}$·s$^{-1}$ (60° C.), $k_{t,St}$=6×10$^7$ L·mol$^{-1}$·s$^{-1}$ (60° C.)].

In the free radical telomerizations of VC with various polyhalide telogens the values of the chain transfer constant range from 0.28–0.29 (CCl$_4$ and CHCl$_3$) to 0.74–1.77 (CHBr$_3$), and from 40 (CCl$_3$Br) and 4 to 74 (CBr$_4$), and to 7 to 54 (CCl$_2$Br$_2$). For the redox catalyzed telomerization of VC in acetonitrile at 100° C. using CCl$_4$ as telogen and FeCl$_3$ as catalyst, it was shown that $C_{CCl4}$=0.025, $C_M$=24×10$^{-4}$ and $C_{FeCl3}$=38. In addition, it was also demonstrated that at 60° C., propagating vinyl chloride radicals are much more reactive (k=1.04×10$^6$ M$^{-1}$·s$^{-1}$) than MMA (k=3.05×10$^3$ M$^{-1}$·s$^{-1}$) or styrene (k=5.4×10$^4$ M$^{-1}$·s$^{-1}$) towards FeCl$_3$ ($C_{FeCl3,VC}$=85.5) which can quantitatively terminate the PVC growing chain. While the values of $C_{CuCl2}$ are not available for VC, for MMA $C_{FeCl3,MMA}$=4.16 and $C_{CuCl2,MMA}$=1050. The values of the chain transfer constants to a chain transfer agent are monomer specific but the relative trends are maintained from monomer to monomer. It is therefore reasonable to assume that $C_{CuCl2,VC}$>$C_{FeCl3,VC}$ and that $C_{CuCl2,VC}$>$C_{telogen}$ and $C_{CuCl2,VC}$>$C_{VC}$. In addition, as the values of the chain transfer constants to the metal species were determined in the absence of solubilizing ligands, it is expected that even larger values are observed in the presence of coordinating ligands.

The polyhaloalkane telogens employed in the metal catalyzed telomerization of VC are therefore characterized by a value of their chain transfer constant that is lower than that of the catalytic metal species. In free radical telomerization of VC, the growing chains are irreversibly terminated by chain transfer to the telogen at low degrees of polymerization. By contrast, in metal catalyzed polymerization of VC initiated in a redox process from metal species and an alkyl halide (R—X where R contains an activating electron withdrawing group such as cyano, esters, perfloroalkyl or another unit capable of stabilizing a radical such as benzyl or allyl and X=halide), the metal halide species has a high value of the chain transfer constant. Consequently, the polymeric chain ends are derived from the R fragment and a halide ligand from the metal salt.

Conventional free radical polymerization of vinyl chloride (VC) is accompanied by the formation of thermally labile tertiary and allylic chlorine defects (Schemes 1 and 2) which are responsible for the low thermal stability of poly(vinyl chloride) (PVC) which provides its most relevant technological limitations.

Scheme 1. Formation of branches and of the allyl defects in PVC produced by free radical polymerization

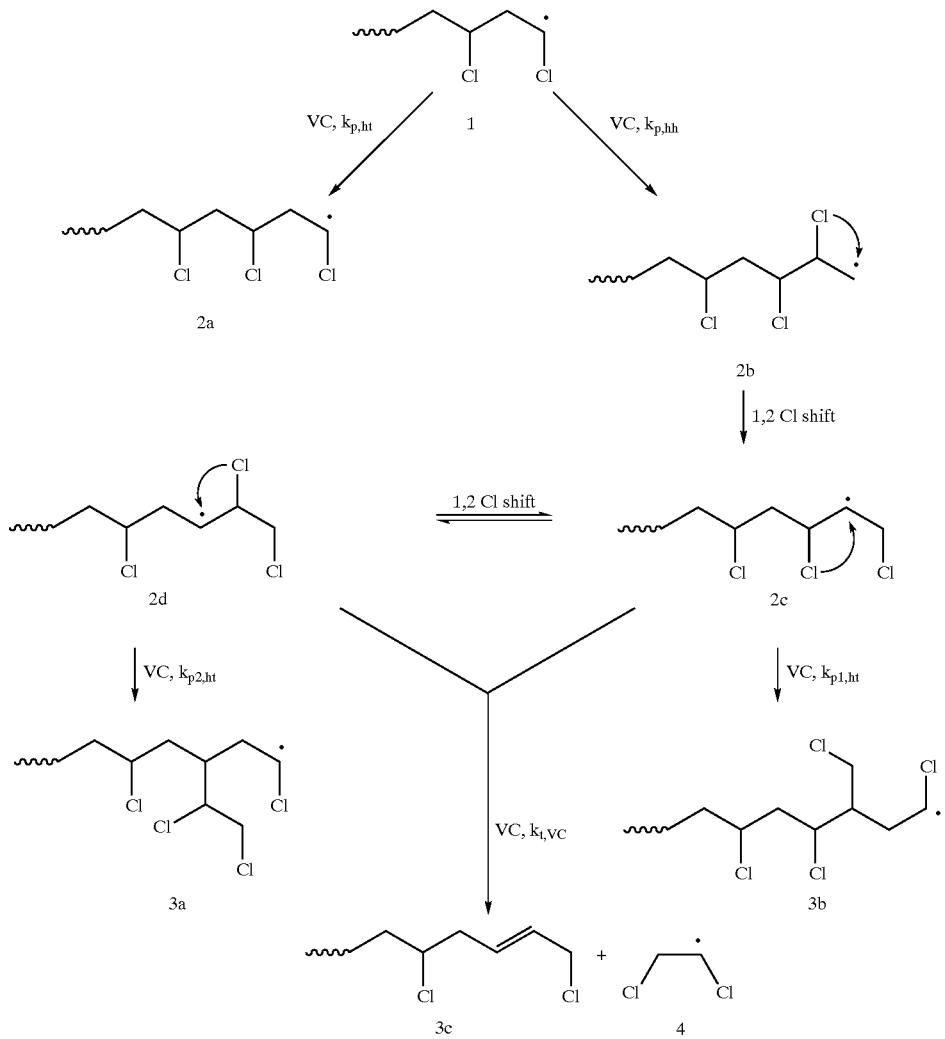

Scheme 2. Mechanism of branching and formation of tertiary and allyl defects via backbiting, chain transfer to monomer and polymer.

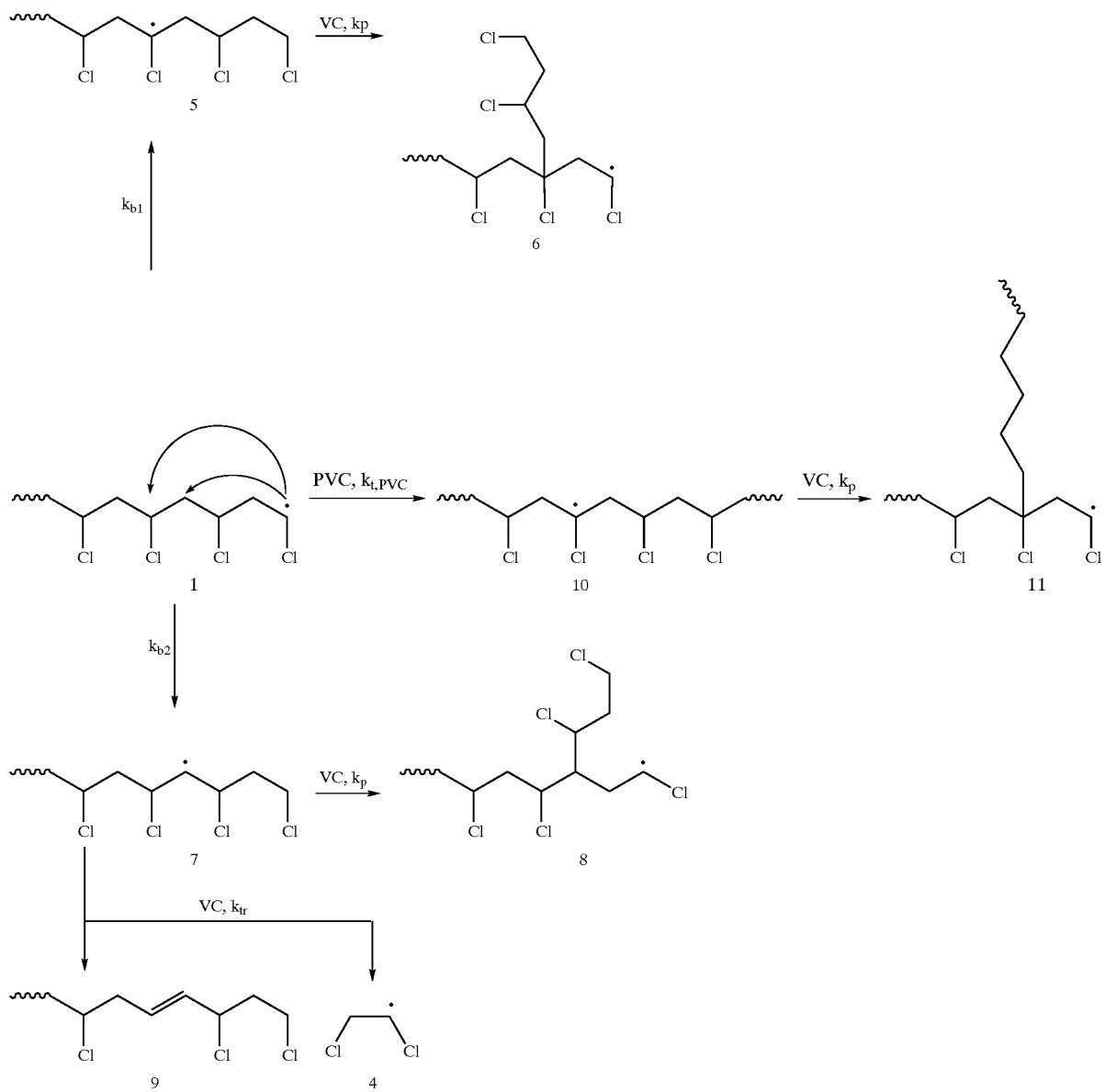

These structural defects are generated during the conventional radical polymerization of VC and are responsible for the initiation of a zipper mechanism of thermal degradation of PVC. Detailed investigations on the mechanism of formation of these defects and subsequent degradation of PVC are available.

Both allylic chloride and $^t$BuCl PVC defects should act as initiators for metal catalyzed living radical polymerization (see for example Percec, V. et al *J. Polym. Sci.: Part A.: Polym. Chem.* 2001, 39, 1120). Therefore, in a metal catalyzed radical polymerization of VC, the labile chlorines generated during the radical propagation process would be involved as new initiating sites for the polymerization of VC and the resulting PVC may have a branched structure but would not contain labile chlorines. Theoretically, if the initiation process is much faster than the propagation and no such side reactions occur, the molecular weight of the polymer increases linearly with conversion while the polydispersity decreases with conversion to values between 2 and 1. In general, the bimolecular radical side reactions are suppressed by reversibly endcapping the growing polymeric chain with a low molecular weight species (i.e. a persistent radical). General reviews of the field include: Otsu, T. *J. Polym. Sci.: Part A.: Polym. Chem.* 2000, 38, 2121; Darling, et al *J. Polym. Sci.: Part A: Polym. Chem.* 2000, 38, 1706; Gaynor, S. G.; Sawamoto, M.; Kamigata, M. Chemtech 1999, 29, 30; Matyjaszewski, K. *ACS Symp. Ser.* 2000, 768, 347; Fischer, H. *J. Polym. Sci., Part A: Polym. Chem.* 1999, 37, 1885.

Previous attempts at the living radical polymerization of vinyl halides did not involve metal catalysis and were based on degenerative chain transfer processes. In addition, the polydispersity never decreased to values below 1.7. See for example Bak, P. I. et al U.S. Pat. No. 5,455,319.

SUMMARY OF THE INVENTION

There has now been found a process for the polymerization of vinyl chloride to form PVC polymers, and not telomers, utilizing a metal-catalyzed radical and living radical polymerization. Various activated mono, di, tri and multifunctional organic halide initiators, including the allylic chlorines normally found in chlorine containing polymers such as PVC, in conjunction with certain metal catalysts, can successfully initiate the radical polymerization of vinyl chloride. Optionally, a solvent or water or mixtures thereof and a ligand for the metal catalyst can be utilized in the polymerization of the vinyl chlorine monomer of the present invention.

BRIEF DESCRIPTION OF THE DRAWING FIGURES

DETAILED DESCRIPTION OF THE INVENTION

Figure 1:
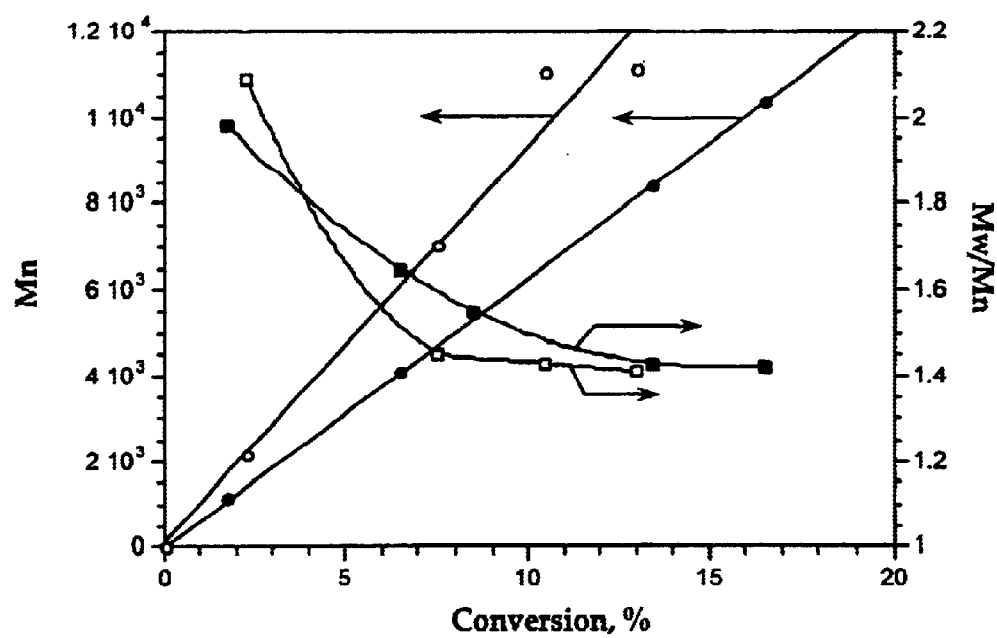
FIG. 1 is an illustration of the dependence of the molecular weight (●,○) andmolecular weight distribution (■,□) on conversion for the metal catalyzed polymerization of vinyl chloride initiated from α,α-diiodo-p-xylene at 130° C. in o-DCB ([VC]=4.8 M). Closed symbols: [VC]:[I]:[Cu(O)]:[bpy]=260:1:4:8; open symbols: [VC]:[I]:[Cu(O)]:[bpy]=520:1:4:8

In the metal-catalyzed polymerization of chlorine containing monomers, appropriate initiators include halides and pseudohalides of the formula R—X, where R having from 1 to 100,000 carbon atoms, contains an activating electron withdrawing group such as cyano, ester, perfloroalkyl or any other unit capable of stabilizing a radical such as benzyl or ally l, and X=halide. The halide initiators include, but are not limited to various activated mono, di, tri and polyfunctional activated halides including α, α-dihaloalkanes, α,α,α-trihaloalkanes, perhaloalkanes, perfloroalkyl halides, benzyl halides, allyl halides, sulfonyl halides, α-haloesters, α-halonitriles, α-haloketones, imidyl halides, or combinations thereof. Additionally, any compound having labile carbon-halide, nitrogen-halide, sulfur-halide, phosporus-halide, or silicon-halide bonds which can dissociate homolytically by themselves or in the presence of a metal catalyst are suitable for use as initiators in the present invention. Suitable structures for initiators utilized in the present invention are set forth in Scheme 3.

Generally, preferred initiators include chlorine, bromine and thiocyanate containing compounds, with iodide initiators being desirable. Mono, di and trifunctional α-haloesters act as active initiators for the polymerization of vinyl chloride in the presence of Fe(0), $TiCp_2Cl_2$ and Cu(0) and its salts such as $Cu_2Te$, $Cu_2Se$, $Cu_2S$, $Cu_2O$, CuCl, CuBr, CuI, copper thiophenoxide (CuSPh), copper butanethiolate (CuSBu), and copper phenylacetylide (CuC≡CPh). Various chlorine containing initiators such as $CH_3$CH(CN)Cl, Cl—$CH_2$—Ph—$CH_2$—Cl or R—CH=CH—$CH_2$—Cl and R—$SO_2$—Cl also promote the polymerization of chlorine containing monomers in the presence of catalysts such as Cu(0) and its salts, Fe(0) and $TiCp_2Cl_2$. The preferred initiators that lead to polymers of narrowest molecular weight distribution in the presence of Cu(0) and its salts or complexes are the active iodine containing substrates of the type $R_1R_2R_3C$—I where at least one of the R substituents is an electron withdrawing group (EWG) or radical stabilizing group such as benzylic, allylic, α-halo, α-cyano, α-ester, α-trifloromethyl and so on. The other R substituents can be H, alkyl chains including polymer chains, electron withdrawing groups and combinations thereof. The preferred iodine containing initiators include: I—$CH_2$—Ph—$CH_2$—I, $CH_3$—CH(Cl)—I, $CH_2I_2$, $CHI_3$, $CI_4$, $CH_2$=CH—$CH_2$—I, $CF_3$—$(CF_2)_n$—I, I—$CH_2$—$CONH_2$ and I—$CH_2$—COO—$(CH_2)_n$—H (n=1–20).

Scheme 3. Selected examples of initiators for the metal catalyzed radical polymerization of vinyl chloride

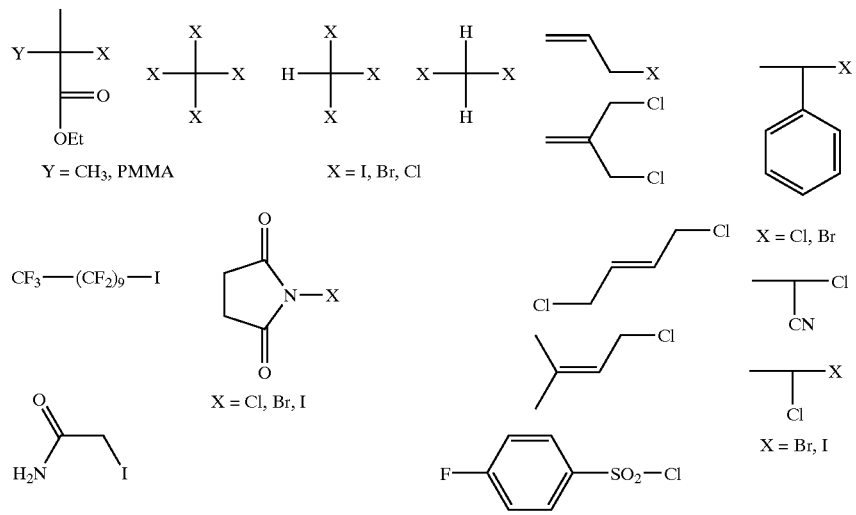

-continued

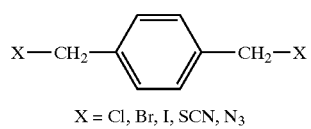
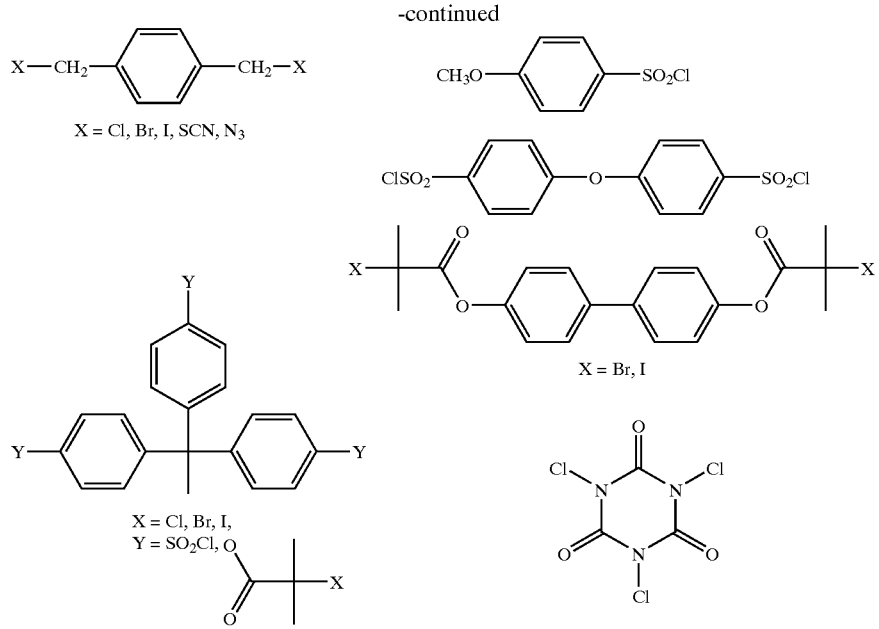

The amounts of such halide initiators utilized depend on the desired molecular weight of the halide containing polymer and are generally from about 5,000 to about 10, desirably from about 1000 to about 25, and preferably from about 500 to about 50 moles of halide containing monomer per one mole of initiating group. Generally the number average molecular weight of the halide containing polymer will be from about 500 to about 100,000, desirably from about 1000 to about 60,000, and preferably from about 3,000 to about 40,000.

The chlorine-containing monomers which are polymerized or copolymerized according to this invention are vinyl chloride and its structurally related derivatives including vinylidene chloride and 2-chloropropene and monomers known to copolymerize via a radical mechanism with vinyl chloride, including one or more of acrylates, vinylidene halides, methacrylates, acrylonitrile, methacrylonitrile, vinyl halides, 2-haloalkenes, styrenes, acrylamide, methacrylamide, vinyl ketones, N-vinylpryrrolidinone, maleic acid esters, or combination thereof. The preferred carbon atom range of each group of monomers is from 2 to 20. The copolymer can have a comonomer content from 1% up to 99%, depending on the reactivity ratios of the comonomers used.

A metal species is utilized to catalyze the initiation reaction and continue the growth of the polymer chain. Typical radical forming catalysts include metal-based catalysts, as metals and/or salts thereof. Examples of such catalysts include metals in their zero oxidation state such as copper, iron, aluminum, cadmium, zinc, samarium, chromium, molybdenum, manganese, tungsten, cobalt, nickel, rhodium, ruthenium, palladium, titanium and certain higher valence salts thereof. The preferred catalyst will be dependent upon the initiator utilized and on the reaction media (such as solvent or water) and temperature. While the initiation step (addition of the radical fragment derived from the initiator to vinyl chloride) may be achieved with all catalysts, it is preferred that the metals be in their zero oxidation state for the metal catalyzed propagation and therefore, living radical polymerization to occur. Additionally, the catalyst may be a mixture of two or more metals in their zero oxidation state, a metal salt or complex, a mixture of two or more metal salts or complexes, or a mixture of two or more metals in their zero oxidation state with metal salts or complexes. Preferred catalysts include Cu(0), copper sulfide ($Cu_2S$), copper selenide ($Cu_2Se$), copper telluride ($Cu_2Te$), copper oxide ($Cu_2O$), copper thiophenoxide (CuSPh), copper butanethiolate (CuSBu), copper phenylacetylide CuC≡CPh, copper chloride (CuCl), copper bromide (CuBr), copper iodide (CuI), Fe(0), and titanium cyclopentadienyl dichloride ($TiCp_2Cl_2$).

It has been found that Cu(0) is able to generate polymers regardless of the nature of the halide in the initiator. When Fe(0) is used as catalyst for the polymerization of vinyl chloride, it has been found that chlorine and bromine based initiators are suitable. The preferred initiators for Fe(0) are for example, the active $(CH_3)_2$(COOEt)—Br, $CH_3$—CH(Ph)—Br, F—Ph—$SO_2$—Cl, as well as the —$CH_2$—($CH_3$)C(COOMe)—Cl chain end of PMMA synthesized by metal catalyzed living radical polymerization. For titanium-based catalysts such as $TiCp_2Cl_2$, chlorine containing initiators such as Cl—$CH_2$—Ph—$CH_2$—Cl and $CH_3$CH(CN)—Cl or $CH_2$=CH—$CH_2$—Cl are particularly suitable.

The amount of catalyst is dependent upon the desired reaction rate. Generally, the amount of catalyst will be from about 0.01 to about 10 desirably from about 0.75 to about 4, and preferably from about 1 to about 3 moles per mole of halide in the initiator.

A ligand can optionally be included in the polymerization reaction in order to aid in the solubilization of the catalyst. The ligand used will depend specifically and uniquely on the type of catalyst, the temperature of the reaction and on the reaction media such as solvent or water. The ligand can be any organic species capable of complexing the metal in its zero oxidation state and in its higher oxidation states. For Cu-based catalysts, the ligands can include basic aromatic and aliphatic nitrogen and phosphorus containing compounds such as 2,2'-bipyridyl (bpy) and its 4,4'-alkyl substituted compounds such as 4,4'-dinonyl-2,2'-bipyridyl (bpy-9), pentamethylene diethyl triamine, (PMDETA), tris(2-aminoethyl)amine (TREN), tris[2-(dimethylamino)ethyl] amine ($Me_6$-TREN), triphenylphosphine, triphenylphosphine oxide, and combinations thereof. The foregoing ligands and 1,10-phenantroline are also appropriate for Fe-based catalysts. In addition, other ligands such as CO, acetylacetonate, or terpyridine may be used. The use of a ligand is not necessary for $TiCp_2Cl_2$ but is preferred for Cu and Fe based catalysts.

When the optional ligand is present, the mixture will usually contain from about 0.1 to about 10 moles of ligand per mole of catalyst, desirably from about 0.75 to about 3 moles of ligand per mole of catalyst, and preferably from about 1 to about 2 moles of ligand per mole of catalyst.

Additionally, various additives may optionally be utilized in the polymerization. Depending on their structure, these additives may affect the molecular weight and molecular weight distribution of the resulting polymer. Such additives can include sodium iodide, urea, $Al^iBu_3$, $Ti(OBu)_4$ and 2,6-di-tertbutyl-4-methyl pyridine, with 2,6-di-tertbutyl-4-methyl pyridine being preferred and may be added in a similar molar amount as the initiator.

Polymerization of the chlorine containing monomer is usually carried out in the presence of the catalyst and initiator in a closed vessel in an inert atmosphere such as nitrogen, or argon; under autogenous or artificially-induced pressure. The temperature of the polymerization can vary widely depending upon the type of initiator and/or catalyst, but is generally from about 0° C. to about 180° C., desirably from about 10° C. to about 150° C. and preferably from about 20° C. to about 130° C. It has been found that lower temperatures, i.e., 20° C.–90° C., depending on the initiator and catalyst system, lead to lower reaction rates and higher molecular weight polymers. For solution polymerizations, the Cu(0)/bpy catalyst in conjunction with the X—$CH_2$—Ph—$CH_2$—X (X=Cl, Br, I, SCN) or $CHI_3$ and $Cl_4$ initiators are effective only at about 120° C. and above, while other chlorine, bromine and iodine based initiators generate polymers at temperatures as low as 60° C. This temperature is enough to allow the metal catalyzed reinitiation from chain such as —CH(Cl)—X (X=I, Br, Cl). Higher temperatures promote an increase in the rate of all reactions including chain transfer to monomer. Therefore, a preferred catalyst will be one reactive enough to promote reinitiation from the active halide chain ends at lower temperatures or to successfully compete with chain transfer to monomer at high temperatures.

Optionally, appropriate solvents such as organic fluids or mixtures of organic fluids may be utilized. Naturally, solvents which do not interfere with the reaction are used and suitable solvents include organic solvents such as chlorobenzene, dichlorobenzene, trichlorobenzene, xylene, diphenylether, 1,2-dichloro ethane, dimethylformamide (DMF), tetrahydrofuran (THF), dioxane, dimethylsulfoxide, (DMSO) ketones or esters or any of the other solvents and plasticisers for PVC and their copolymers known in the literature and to those skilled in the art. The amount of solvent used depends on the desired solubility of the system, on the temperature and the desired pressure in the reaction vessel, and can be easily determined by one skilled in the art. The amount of solvent generally ranges from about 25 to about 1000, desirably from about 50 to about 500, and preferably from about 75 to about 400 parts per 100 parts of halide containing monomer, such as vinyl chloride.

Alternatively, it has been found that the living free radical polymerization of vinyl chloride can be carried out in the absence of solvent. In such situations, the polymerization is generally carried out in bulk and the other reaction conditions set forth hereinabove are generally suitable.

Alternatively, it has also been found that the living radical polymerization of vinyl chloride can be carried out in water and in water/organic solvent mixtures using the aforementioned solvents as well as other solvents. The presence of an emulsifier such as sodium dodecylsulfate (NaDDS) is optional. The aforementioned conditions still apply. In addition, it was also found that the Cu(0)/TREN, $Cu_2Y$/TREN (Y=O, S, Se, Te), and CuX/TREN (X=Cl, Br, I, SPh, SBu, C=CPh) catalyst and ligand systems or mixtures thereof can successfully catalyze VC polymerization initiated from iodo, bromo or chloro containing initiators to complete conversion at room temperature. The amount of the optional emulsifier depends of the desired particle size, nature of the emulsifier, and the water to monomer ratio and can be easily selected by one skilled in the art.

Depending on the desired properties of the homopolymer or copolymer, the polymerizations can be either batch, semi-batch or continuous. Mechanical agitation is desirable, but not necessary. Normal polymerization time depends on the temperature and the monomer to initiator to catalyst to ligand ratios and is from 0.5 to about 24 hours.

Subsequent to the formation of the polymer composition, solvent and excess monomer are removed, for example by evaporation, precipitation of the polymer, and the like.

An advantage of the living radical polymerization process described herein is that it will produce a chlorine containing polymer, such as PVC, with controlled molecular weight, such that the molecular weight increases with conversion of the monomer. Additionally, the living radical polymerization process will provide a PVC with narrow molecular weight distribution and with well defined chain ends, i.e., telechelics and macromonomers. Such molecular weight distribution, i.e., Mw/Mn, can be from $\leq 2.0$, $\leq 1.9$, or $\leq 1.8$ down to $\leq 1.7$, $\leq 1.6$, $\leq 1.5$ or even $\leq 1.4$ $\leq 1.2$ and even $\leq 1.10$. A decrease in molecular weight distribution of from about $\leq 1.7$ to about $\leq 1.5$ is preferred and from about $\leq 1.5$ to about $\leq 1.1$ is most preferred. Moreover, the metal catalyzed process allows the synthesis of PVC at high reaction temperatures and with higher molecular weight than that which can be obtained by a free radical polymerization of VC at the said high temperature. Alternatively, the polymerization can be carried out in water and at room temperature. Since the structural defects in PVC are responsible for its low thermal stability, PVC obtained by living radical polymerization will be more stable than conventional PVC, thereby expanding the range of technological applications of PVC.

The vinyl chloride compositions described herein can be useful as plastic materials, viscosity/flow modifiers, additives for flame retardant compositions, and compatibilizers.

TABLE 1

Polymerization of Vinyl Chloride Initiated from Various Halides and Catalyzed by Fe(O).

| Exp | Initiator | Catalyst/Ligand | [VC]:[I]:[C]:[L][a] | Time h | Conv % | Mn | Mw/Mn | Temp °C. | Solvent |
|---|---|---|---|---|---|---|---|---|---|
| 1 | Br—(CH$_3$)$_2$C(COOEt) | Fe(O)/Phen | 65:1:0.6:1 | 19 | 26 | 10,000 | 1.66 | 90 | oDCB |
| 2 | Br—(CH$_3$)$_2$C(COOEt) | Fe(O)/Phen | 130:1:1.2:2 | 22 | 19 | 7,000 | 1.75 | 90 | THF |
| 3 | Br—(CH$_3$)$_2$C(COOEt) | Fe(O)/Phen | 130:1:1.2:2.4 | 22 | 16 | 7,200 | 1.85 | 90 | DMF |
| 4 | Br—(CH$_3$)$_2$C(COOEt) | Fe(O)/Phen | 130:1:1.2:2 | 40 | 15 | 19,100 | 1.65 | 60 | oDCB |
| 5 | Br—(CH$_3$)$_2$C(COOEt) | Fe(O)/Phen | 130:1:1.2:2.4 | 22 | 30 | 10,200 | 1.73 | 90 | oDCB |
| 6 | Br—(CH$_3$)$_2$C(COOEt) | Fe(O)/Phen | 130:1:1.2:2.4 | 22 | 33 | 8,300 | 1.85 | 130 | oDCB |
| 7 | Br—(CH$_3$)$_2$C(COOEt) | Fe(O)/Phen | 120:1:1.2:2.4: | 20 | 42 | 9,000 | 1.75 | 90 | oDCB |
| 8 | Br—(CH$_3$)$_2$C(COOEt) | Fe(O)/Phen/Al$^i$Bu$_3$ | 130:1:1.2:2:1.2 | 22 | 10 | 12,900 | 1.59 | 90 | oDCB |
| 9 | Cl—(CH$_3$)C(COOMe)—CH$_2$—PMMA | Fe(O)/Phen | 450:1:4.5:3.5 | 22 | 35 | 8,300 | 1.73 | 90 | oDCB |
| 10 | Br—C(CH$_3$)$_2$—CO—O—Ph—Ph—OCO—C(CH$_3$)$_2$—Br | Fe(O)/Phen | 130:1:2:4 | 96 | 36 | 8,400 | 1.75 | 90 | oDCB |
| 11 | Br—CH(Ph)CH$_3$ | Fe(O)/Phen | 130:1:1.2:2 | 19 | 27 | 12,500 | 1.75 | 90 | oDCB |
| 12 | Br—CH$_2$—Ph—CH$_2$—Br | Fe(O)/Phen | 130:1:1.2:2.4 | 22 | 10 | 13,300 | 1.5 | 90 | oDCB |
| 13 | Br—CH$_2$—Ph—CH$_2$—Br | Fe(O)/Phen | 130:1:2:4 | 96 | 5 | 2,600 | 1.96 | 90 | oDCB |
| 14 | Cl—CH$_2$—Ph—CH$_2$—Cl | Fe(O)/Phen | 130:1:2:4 | 96 | 5 | 8,300 | 1.65 | 90 | oDCB |
| 15 | I—CH$_2$—Ph—CH$_2$—I | Fe(O)/Phen | 130:1:2:4 | 23 | 10 | 4,300 | 1.98 | 130 | oDCB |
| 16 | NCS—CH$_2$—Ph—CH$_2$—SCN | Fe(O)/Phen | 130:1:2:4 | 48 | 8 | 4,800 | 1.90 | 90 | oDCB |
| 17 | Cl—(CN)CHCH$_3$ | Fe(O)/Phen | 130:1:1.2:2.4 | 19 | 10 | 9,400 | 1.61 | 90 | oDCB |
| 18 | Cl—(CN)CHCH$_3$ | Fe(CO)$_5$ | 130:1:1.2 | 18 | 4 | 14,300 | 1.65 | 90 | oDCB |
| 19 | Cl—SO$_2$—Ph—F | Fe(O)/Phen | 130:1:1.2:2.4 | 18 | 22 | 7,600 | 1.82 | 90 | oDCB |

[a] Molar ratio of VC to initiator to catalyst to ligand

TABLE 2

Polymerization of Vinyl Chloride initiated from Various Halides and Catalyzed by TiCp$_2$Cl$_2$.

| Exp | Initiator | Catalyst/Additive | [VC]:[I]:[C]:[A][a] | Time h | Conv % | Mn | Mw/Mn | Temp °C. | Solvent |
|---|---|---|---|---|---|---|---|---|---|
| 20 | — | TiCp$_2$Cl$_2$ | 130:0:1 | 20 | 3 | 12,000 | 1.67 | 70 | oDCB |
| 21 | Br—(CH$_3$)$_2$C—COOEt | TiCp$_2$Cl$_2$ | 130:1:1.2 | 22 | 10 | 15,000 | 1.78 | 90 | oDCB |
| 22 | Br—(CH$_3$)$_2$C—COOEt | TiCp$_2$Cl$_2$ | 130:1:1.2 | 20 | 7 | 21,400 | 1.68 | 60 | oDCB |
| 23 | Br—(CH$_3$)$_2$C—COOEt | TiCp$_2$Cl$_2$/Al$^i$Bu$_3$ | 130:1:1.2:3.6 | 17 | 60 | 3,800 | 2.10 | 90 | oDCB |
| 24 | Br—(CH$_3$)$_2$C—COOEt | TiCp$_2$Cl$_2$/Zn/bpy | 130:1:1.2:1.8:0.7 | 22 | 22 | 14,800 | 1.95 | 90 | oDCB |
| 25 | Br—(CH$_3$)$_2$C—COOEt | Ti(OBu)$_4$/Al$^i$Bu$_3$ | 130:1:1.2:3.6 | 17 | 87 | 5,300 | 1.80 | 90 | oDCB |
| 26 | Br—C(CH$_3$)$_2$—CO—O—Ph—Ph—OCO—C(CH$_3$)$_2$—Br | TiCp$_2$Cl$_2$ | 520:1:2 | 20 | 5 | 3,100 | 2.05 | 130 | oDCB |
| 27 | Br—C(CH$_3$)$_2$—OCO—Ph—C(CH$_3$)—[(Ph—OCO—C(CH$_3$)$_2$—Br]$_2$ | TiCp$_2$Cl$_2$ | 520:1:2 | 20 | 7 | 4,400 | 1.81 | 130 | oDCB |
| 28 | Br—CH$_2$—Ph—CH$_2$—Br | TiCp$_2$Cl$_2$ | 520:1:2 | 20 | 5 | 3,600 | 1.86 | 130 | oDCB |
| 29 | Cl—CH$_2$—Ph—CH$_2$—Cl | TiCp$_2$Cl$_2$ | 520:1:2 | 20 | 28 | 4,900 | 1.81 | 130 | oDCB |
| 30 | Cl—CH$_2$—Ph—CH$_2$—Cl | TiCp$_2$Cl$_2$ | 520:1:2 | 96 | 38 | 10,600 | 1.80 | 90 | oDCB |
| 31 | NCS—CH$_2$—Ph—CH$_2$—SCN | TiCp$_2$Cl$_2$ | 260:1:3.5 | 22 | 5 | 4,000 | 2.05 | 130 | oDCB |
| 32 | Cl—CH(CN)CH$_3$ | TiCp$_2$Cl$_2$ | 130:1:1.2 | 19 | 22 | 16,000 | 1.72 | 90 | oDCB |
| 33 | Br—N(CO—CH$_2$—CH$_2$—CO) | TiCp$_2$Cl$_2$ | 130:1:1.2 | 19 | 4 | 19,000 | 1.75 | 90 | oDCB |
| 34 | Cl$_3$(—NCO—)$_3$ | TiCp$_2$Cl$_2$ | 390:1:2.1 | 20 | 5 | 8,200 | 1.80 | 90 | oDCB |
| 35 | (Cl—SO$_2$—Ph)$_3$C—CH$_3$ | TiCp$_2$Cl$_2$ | 400:1:9 | 22 | 7 | 4,000 | 2.05 | 110 | oDCB |
| 36 | Cl—SO$_2$—Ph—F | TiCp$_2$Cl$_2$ | 130:1:1.2 | 19 | 22 | 12,000 | 1.65 | 90 | oDCB |

[a] Molar ratio of VC to initiator to catalyst to additive

TABLE 3

Polymerization of Vinyl Chloride Initiated from Various Halides and Catalyzed by Cu(I).

| Exp | Initiator | Catalyst/Ligand | [VC]:[I]:[C]:[L][a] | Time h | Mn | Mw/Mn | Conv % | Temp °C. | Solvent |
|---|---|---|---|---|---|---|---|---|---|
| 37 | Br—C(CH$_3$)$_2$—CO—O—Ph—Ph—O—CO—C(CH$_3$)$_2$—Br | CuBr/Me$_6$—TREN | 260:1:4:8 | 20 | 2,500 | 1.45 | 8 | 130 | oDCB |
| 38 | Br—C(CH$_3$)$_2$—CO—O—Ph—Ph—O—CO—C(CH$_3$)$_2$—Br | CuBr/Me$_6$—TREN | 260:1:4:4 | 20 | 750 | 1.80 | 2 | 90 | oDCB |
| 39 | Cl—(CN)CHCH$_3$ | CuC≡C—Ph/bpy | 100:1:1.5:3 | 19 | 1,300 | 3.60 | 15 | 90 | DMF |
| 40 | Cl—(CN)CHCH$_3$ | CuSPh/bpy | 140:1:0.7:1.2 | 19 | 2,800 | 3.30 | 13 | 60 | DMF |
| 41 | I—CH(Cl)—CH$_3$ | CuBr/Me$_6$—TREN | 260:1:2:4 | 44 | 3,200 | 1.30 | 5 | 90 | oDCB |
| 42 | I—CH(Cl)—CH$_3$ | CuBr/Me$_6$—TREN | 520:1:4:4 | 20 | 4,100 | 1.27 | 3 | 130 | oDCB |
| 43 | I—CH(Cl)—CH$_3$ | CuBr/Me$_6$—TREN | 60:1:1:1 | 20 | 2,000 | 1.40 | 5 | 90 | oDCB |
| 44 | I—CH(Cl)—CH$_3$ | CuI/Me$_6$—TREN | 130:1:1:1 | 20 | 1,700 | 1.21 | 2 | 90 | oDCB |
| 45 | I—CH$_2$—Ph—CH$_2$—I | CuBr/Me$_6$—TREN | 520:1:8:8 | 20 | 4,400 | 1.50 | 4 | 130 | oDCB |

TABLE 3-continued

Polymerization of Vinyl Chloride Initiated from Various Halides and Catalyzed by Cu(I).

| Exp | Initiator | Catalyst/Ligand | [VC]:[I]:[C]:[L][a] | Time h | Mn | Mw/Mn | Conv % | Temp °C | Solvent |
|---|---|---|---|---|---|---|---|---|---|
| 46 | NCS—$CH_2$—Ph—$CH_2$—SCN | $Cu_2Te$/bpy | 260:1:4:8 | 22 | 5,100 | 2.23 | 8 | 130 | oDCB |
| 47 | NCS—$CH_2$—Ph—$CH_2$—SCN | CuBr/$Me_6$—TREN | 520:1:4:4 | 20 | 1,000 | 1.55 | 2 | 130 | oDCB |

[a] Molar ratio of VC to initiator to catalyst to ligand.

TABLE 4

Polymerization of Vinyl Chloride Initiated from Various Halides and Catalyzed by Cu (O).

| Exp | Initiator | Catalyst/Ligand | [VC]:[I]:[C]:[L][a] | Time H | Conv % | Mn | Mw/Mn | Temp °C | Solvent |
|---|---|---|---|---|---|---|---|---|---|
| 48 | Cl—$CH_2$—C($CH_2$—Cl)=$CH_2$ | Cu(O)/bpy | 200:1:4:8 | 20 | 31 | 7,700 | 1.85 | 130 | oDCB |
| 49 | Cl—$CH_2$—CH=C($CH_3$)$_2$ | Cu(O)/bpy | 100:1:2:4 | 20 | 20 | 8,300 | 1.62 | 130 | oDCB |
| 50 | Cl—$CH_2$—CH=$CH_2$ | Cu(O)/bpy | 100:1:2:4 | 20 | 27 | 6,100 | 1.83 | 130 | oDCB |
| 51 | Cl—CH(CN)$CH_3$ | Cu(O)/bpy | 130:1:1.2:1.2 | 19 | 20 | 6,900 | 1.85 | 90 | DMF |
| 52 | Cl—CH(CN)$CH_3$ | Cu(O)/bpy | 130:1:1.2:2.4 | 19 | 12 | 7,300 | 1.93 | 130 | oDCB |
| 53 | Cl—$CH_2$—Cl | Cu(O)/bpy | 100:1:2:4 | 20 | 5 | 50,000 | 2.75 | 130 | oDCB |
| 54 | Cl—$CH_2$—Ph—$CH_2$—Cl | Cu(O)/bpy | 260:1:4:8 | 21 | 34 | 5,600 | 1.62 | 130 | oDCB |
| 55 | Cl—$CH_2$—Ph—$CH_2$—Cl | Cu(O)/bpy | 1000:1:8:16 | 20 | 18 | 22,400 | 1.53 | 130 | oDCB |
| 56 | Cl—$CH_2$—Ph—$CH_2$—Cl | Cu(O)/bpy | 60:1:4:4 | 20 | 95 | gel | — | 130 | oDCB |
| 57 | Br—($CH_3$)$_2$C—COBr | Cu(O)/bpy | 130:1:4:8 | 22 | 12 | 17,000 | 1.90 | 90 | oDCB |
| 58 | Br—($CH_3$)$_2$C—COOEt | Cu(O)/bpy | 130:1:1.2:1.8 | 22 | 20 | 8,100 | 1.85 | 90 | oDCB |
| 59 | Br—($CH_3$)$_2$C—COOEt | Cu(O)/bpy/Al$^i$Bu$_3$ | 130:1:1.2:1.8:1.2 | 22 | 77 | 6,400 | 1.85 | 90 | oDCB |
| 60 | (Br—$CH_2$)$_4$Ph | Cu(O)/bpy | 125:1:8:16 | 20 | 7 | 23,700 | 1.58 | 130 | oDCB |
| 61 | Br—C($CH_3$)$_2$—COO—Ph—C($CH_3$)$_2$—Ph—OCO—C($CH_3$)$_2$—Br | Cu(O)/bpy | 260:1:4:8 | 17 | 30 | 6,300 | 1.45 | 130 | oDCB |
| 62 | Br—C($CH_3$)$_2$—COO—Ph—C($CH_3$)$_2$—Ph—OCO—C($CH_3$)$_2$—Br | Cu(O)/bpy | 260:1:4:8 | 65 | 42 | 11,100 | 1.72 | 90 | oDCB |
| 63 | Br—C($CH_3$)$_2$—COO—Ph—C($CH_3$)$_2$—Ph—OCO—C($CH_3$)$_2$—Br | Cu(O)/bpy/NaI | 260:1:3:4.5:3 | 20 | 20 | 4,200 | 1.50 | 130 | oDCB |
| 64 | Br—C($CH_3$)$_2$—CO—O—Ph—Ph—O—CO—C($CH_3$)$_2$—Br | Cu(O)/PMDETA | 260:1:4:8 | 20 | 35 | gel | — | 90 | oDCB |
| 65 | Br—C($CH_3$)$_2$—CO—O—Ph—Ph—OCO—C($CH_3$)$_2$—Br | Cu(O)/bpy | 260:1:4:8 | 22 | 30 | 5,700 | 1.48 | 130 | oDCB |
| 66 | Br—C($CH_3$)$_2$—OCO—Ph—C($CH_3$)—[(Ph—OCO—C($CH_3$)$_2$—Br]$_2$ | Cu(O)/bpy | 390:1:6:12 | 18 | 14 | 6,800 | 1.98 | 130 | oDCB |
| 67 | Br—CH(Cl)—$CH_3$ | Cu(O)/bpy | 100:1:2:4 | 20 | 40 | 6,000 | 2.30 | 130 | oDCB |
| 68 | Br—CH(Ph)$CH_3$ | Cu(O)/bpy | 130:1:2.2:3 | 66 | 26 | 6,000 | 1.75 | 130 | oDCB |
| 69 | Br—CH(Ph)$CH_3$ | Cu(O)/bpy/NaI | 130:1:2:4:2 | 24 | 26 | 4,300 | 1.70 | 130 | oDCB |
| 70 | Br—$CH_2$—Ph—$CH_2$—Br | Cu(O)/bpy | 260:1:4:8 | 20 | 43 | 11,000 | 1.63 | 130 | oDCB |
| 71 | Br—N(CO—$CH_2$—$CH_2$—CO) | Cu(O)/bpy | 130:1:2:4 | 20 | 1 | 5,600 | 1.60 | 130 | oDCB |
| 72 | I—C($CH_3$)$_2$—CO—O—Ph—Ph—O—CO—C($CH_3$)$_2$—I | Cu(O)/bpy | 260:1:4:8 | 20 | 38 | 6,700 | 1.47 | 130 | oDCB |
| 73 | I—C($CH_3$)$_2$—CO—O—Ph—C($CH_3$)$_2$—Ph—O—CO—C($CH_3$)$_2$—I | Cu(O)/bpy | 260:1:4:8 | 21 | 28 | 7,000 | 1.60 | 90 | oDCB |
| 74 | I—C($CH_3$)$_2$—OC—OPh—C($CH_3$)—[(Ph—OCO—C($CH_3$)$_2$—I]$_2$ | Cu(O)/bpy | 390:1:6:12 | 70 | 30 | 8,600 | 1.67 | 130 | oDCB |
| 75 | I—$CF_2$—($CF_2$)$_8$—$CF_3$ | Cu(O)/bpy | 130:1:2:4 | 22 | 26 | 5,800 | 1.64 | 130 | oDCB |
| 76 | I—$CH_2$—CH=$CH_2$ | Cu(O)/bpy | 130:1:1.2:2.2 | 20 | 13.5 | 6,500 | 1.70 | 90 | oDCB |
| 77 | I—$CH_2$—CH=$CH_2$ | Cu(O)/bpy | 130:1:5:2.5 | 22 | 27 | 13,100 | 1.93 | 90 | oDCB |
| 78 | I—$CH_2$—CH=$CH_2$ | Cu(O)/bpy | 260:1:2:4 | 24 | 22 | 6,800 | 1.72 | 130 | oDCB |
| 79 | I—$CH_2$—CH=$CH_2$ | Cu(O)/bpy | 260:1:2:2 | 20 | 12 | 3,400 | 1.84 | 130 | oDCB |
| 80 | $CHI_3$ | Cu(O)/bpy | 50:1:1.5:3 | 20 | 8 | 3,300 | 1.25 | 130 | oDCB |
| 81 | $CHI_3$ | Cu(O)/bpy | 50:1:3:6 | 20 | 40 | 3,700 | 1.65 | 130 | oDCB |
| 82 | $CHI_3$ | Cu(O)/bpy | 150:1:3:6 | 20 | 19 | 4,500 | 1.35 | 130 | oDCB |
| 83 | $CHI_3$ | Cu(O)/bpy | 150:1:1.5:3 | 20 | 3 | 760 | 1.38 | 130 | oDCB |
| 84 | $CHI_3$ | Cu(O)/bpy | 150:1:6:12 | 20 | 33 | 6,100 | 1.65 | 130 | oDCB |
| 85 | $CHI_3$ | Cu(O)/bpy | 1500:1:6:12 | 20 | 7 | 17,400 | 1.40 | 130 | oDCB |
| 86 | $CHI_3$ | Cu(O)/bpy | 1500:1:12:24 | 20 | 11 | 30,000 | 1.63 | 130 | oDCB |
| 87 | $CHI_3$ | Cu(O)/bpy | 1500:1:12:24 | 20 | 1 | 11,400 | 1.55 | 90 | oDCB |
| 88 | $CHI_3$ | Cu(O)/bpy | 3100:1:12:24 | 20 | 8 | 45,000 | 1.59 | 130 | oDCB |
| 89 | $CHI_3$ | Cu(O)/TREN | 150:1:0.75:0.75 | 20 | 10 | 5,000 | 1.58 | 130 | oDCB |
| 90 | $Cl_4$ | Cu(O)/bpy | 150:1:4:8 | 20 | 2 | 2,500 | 1.45 | 130 | oDCB |
| 91 | $Cl_4$ | Cu(O)/bpy | 1000:1:8:16 | 20 | 7 | 17,400 | 1.52 | 130 | oDCB |
| 92 | I—CH(Cl)—$CH_3$ | Cu(O)/bpy | 130:1:2:4 | 67 | 28 | 3,500 | 1.75 | 130 | oDCB |
| 93 | I—CH(Cl)—$CH_3$ | Cu(O)/bpy | 130:1:2:4 | 21 | 42 | 3,900 | 1.65 | 90 | oDCB |
| 94 | I—CH(Cl)—$CH_3$ | Cu(O)/bpy | 130:1:2:4 | 44 | 36 | 8,400 | 1.55 | 60 | oDCB |
| 95 | I—CH(Cl)—$CH_3$ | Cu(O)/bpy | 520:1:2:4 | 44 | 13 | 7,700 | 1.70 | 90 | oDCB |
| 96 | I—CH(Cl)—$CH_3$ | Cu(O)/TREN | 520:1:1:1 | 20 | 28 | 7,900 | 1.65 | 130 | oDCB |
| 97 | I—CH(Cl)—$CH_3$ | Cu(O)/bpy | 100:1:2:4 | 20 | 15 | 5,200 | 1.78 | 60 | Bulk |
| 98 | I—CH(Cl)—$CH_3$ | Cu(O)/bpy | 100:1:2:4 | 20 | 22 | 5,600 | 1.77 | 60 | o-DCB |

TABLE 4-continued

Polymerization of Vinyl Chloride Initiated from Various Halides and Catalyzed by Cu (O).

| Exp | Initiator | Catalyst/Ligand | [VC]:[I]:[C]:[L][a] | Time H | Conv % | Mn | Mw/Mn | Temp °C. | Solvent |
|---|---|---|---|---|---|---|---|---|---|
| 99 | I—CH(Cl)—CH$_3$ | Cu(O)/bpy | 100:1:2:4 | 20 | 26 | 6,200 | 1.78 | 60 | o-DCB |
| 100 | I—CH(Cl)—CH$_3$ | Cu(O)/bpy | 100:1:2:4 | 20 | 14 | 6,500 | 1.69 | 60 | o-DCB |
| 101 | I—CH(Cl)—CH$_3$ | Cu(O)/bpy | 100:1:2:4 | 20 | 18 | 5,400 | 1.87 | 90 | Bulk |
| 102 | I—CH(Cl)—CH$_3$ | Cu(O)/bpy | 100:1:2:4 | 20 | 45 | 7,800 | 1.67 | 90 | o-DCB |
| 103 | I—CH(Cl)—CH$_3$ | Cu(O)/bpy | 100:1:2:4 | 20 | 55 | 7,300 | 1.79 | 90 | o-DCB |
| 104 | I—CH(Cl)—CH$_3$ | Cu(O)/bpy | 100:1:2:4 | 20 | 52 | 8,300 | 1.68 | 90 | o-DCB |
| 105 | I—CH(Cl)—CH$_3$ | Cu(O)/bpy | 100:1:2:4 | 20 | 39 | 5,500 | 1.78 | 130 | o-DCB |
| 106 | I—CH(Cl)—CH$_3$ | Cu(O)/bpy | 100:1:2:4 | 20 | 38 | 6,100 | 1.77 | 130 | o-DCB |
| 107 | I—CH(Cl)—CH$_3$ | Cu(O)/bpy | 100:1:2:4 | 20 | 43 | 7,100 | 1.65 | 130 | o-DCB |
| 108 | I—CH(Cl)—CH$_3$ | Cu(O)/bpy | 100:1:2:4 | 20 | 39 | 6,800 | 1.68 | 130 | o-DCB |
| 109 | I—CH(Cl)—CH$_3$ | Cu(O)/bpy/NaDDS | 100:1:2:4:0.1 | 20 | 53 | 10,600 | 1.65 | 90 | H$_2$O |
| 110 | I—CH(Cl)—CH$_3$ | Cu(O)/bpy/NaDDS | 100:1:2:4:0.5 | 20 | 47 | 8,500 | 1.69 | 90 | H$_2$O |
| 111 | I—CH(Cl)—CH$_3$ | Cu(O)/bpy/NaDDS | 100:1:2:4:1 | 20 | 41 | 7,000 | 1.75 | 90 | H$_2$O |
| 112 | I—CH(Cl)—CH$_3$ | Cu(O)/bpy/NaDDS | 100:1:2:4:2 | 20 | 43 | 7,500 | 1.66 | 90 | H$_2$O |
| 113 | I—CH(Cl)—CH$_3$ | Cu(O)/bpy/NaDDS | 100:1:2:4:4 | 20 | 45 | 7,300 | 1.72 | 90 | H$_2$O |
| 114 | I—CH(Cl)—CH$_3$ | Cu(O)/bpy/NaDDS | 100:1:2:4:0.5 | 1 | 30 | 4,700 | 1.67 | 90 | H$_2$O |
| 115 | I—CH(Cl)—CH$_3$ | Cu(O)/bpy/NaDDS | 100:1:2:4:0.5 | 2 | 34 | 6,200 | 1.71 | 90 | H$_2$O |
| 116 | I—CH(Cl)—CH$_3$ | Cu(O)/bpy/NaDDS | 100:1:2:4:0.5 | 4 | 44 | 7,100 | 1.76 | 90 | H$_2$O |
| 117 | I—CH(Cl)—CH$_3$ | Cu(O)/bpy/NaDDS | 100:1:2:4:0.5 | 8 | 49 | 8,500 | 1.72 | 90 | H$_2$O |
| 118 | I—CH$_2$—Ph—CH$_2$—I | Cu(O)/bpy | 80:1:4:8 | 20 | 35 | 7,900 | 1.61 | 130 | oDCB |
| 119 | I—CH$_2$—Ph—CH$_2$—I | Cu(O)/bpy | 130:1:4:8 | 20 | 31 | 10,300 | 1.58 | 130 | oDCB |
| 120 | I—CH$_2$—Ph—CH$_2$—I | Cu(O)/bpy | 260:1:4:8 | 20 | 19 | 8,400 | 1.55 | 130 | Et$_2$CO$_3$ |
| 121 | I—CH$_2$—Ph—CH$_2$—I | Cu(O)/Me$_6$—TREN | 260:1:4:4 | 20 | 14 | 3,000 | 1.80 | 130 | oDCB |
| 122 | I—CH$_2$—Ph—CH$_2$—I | Cu(O)/TREN | 520:1:4:4 | 20 | 37 | Gel | — | 130 | oDCB |
| 123 | I—CH$_2$—Ph—CH$_2$—I | Cu(O)/bpy | 520:1:4:8 | 20 | 5 | 3,100 | 2.05 | 130 | DMSO |
| 124 | I—CH$_2$—Ph—CH$_2$—I | Cu(O)/bpy | 130:1:2:4 | 22 | 18 | 6,100 | 2.02 | 130 | DMF |
| 125 | I—CH$_2$—Ph—CH$_2$—I | Cu(O)/bpy | 260:1:4:8 | 1 | 1.5 | 1,100 | 1.98 | 130 | oDCB |
| 126 | I—CH$_2$—Ph—CH$_2$—I | Cu(O)/bpy | 260:1:4:8 | 2 | 6.6 | 4,100 | 1.65 | 130 | oDCB |
| 127 | I—CH$_2$—Ph—CH$_2$—I | Cu(O)/bpy | 260:1:4:8 | 4 | 11 | 7,600 | 1.48 | 130 | oDCB |
| 128 | I—CH$_2$—Ph—CH$_2$—I | Cu(O)/bpy | 260:1:4:8 | 7 | 13.4 | 8,300 | 1.46 | 130 | oDCB |
| 129 | I—CH$_2$—Ph—CH$_2$—I | Cu(O)/bpy | 260:1:4:8 | 13 | 17.5 | 10,400 | 1.48 | 130 | oDCB |
| 130 | I—CH$_2$—Ph—CH$_2$—I | Cu(O)/bpy | 520:1:4:8 | 2 | 2.2 | 2,100 | 2.10 | 130 | oDCB |
| 131 | I—CH$_2$—Ph—CH$_2$—I | Cu(O)/bpy | 520:1:4:8 | 5 | 7.5 | 7,019 | 1.49 | 130 | oDCB |
| 132 | I—CH$_2$—Ph—CH$_2$—I | Cu(O)/bpy | 520:1:4:8 | 11 | 11 | 11,000 | 1.45 | 130 | oDCB |
| 133 | I—CH$_2$—Ph—CH$_2$—I | Cu(O)/bpy/Al$^i$Bu$_3$ | 520:1:4:8:2.6 | 22 | 20 | 12,700 | 1.59 | 130 | oDCB |
| 134 | I—CH$_2$—Ph—CH$_2$—I | Cu(O)/bpy | 520:1:8:8 | 21 | 20 | 29,600 | 1.89 | 130 | oDCB |
| 135 | I—CH$_2$—Ph—CH$_2$—I | Cu(O)/bpy | 520:1:16:8 | 21 | 43 | gel | — | 130 | oDCB |
| 136 | I—CH$_2$—Ph—CH$_2$—I | Cu(O)/bpy/DtBP | 1000:1:4:8:8 | 20 | 16 | 14,200 | 1.49 | 130 | oDCB |
| 137 | I—CH$_2$—Ph—CH$_2$—I | Cu(O)/bpy | 1000:1:16:32 | 20 | 17 | 16,400 | 1.63 | 130 | oDCB |
| 138 | I—CH$_2$—Ph—CH$_2$—I | Cu(O)/bpy | 1000:1:8:16 | 20 | 9 | 15,500 | 1.59 | 130 | oDCB |
| 137 | I—CH$_2$—Ph—CH$_2$—I | Cu(O)/bpy | 260:1:4:8 | 23 | 20 | 21,000 | 1.60 | 130 | oDCB |
| 139 | NCS—CH$_2$—Ph—CH$_2$—SCN | Cu(O)/bpy | 260:1:4:8 | 20 | 26 | 11,000 | 3.14 | 130 | oDCB |

[a] Molar ratio of VC to initiator to catalyst to ligand.

TABLE 5

Polymerization of Vinyl Chloride catalyzed by Various Metal Derivatives and Metals in their Zero Oxidation State.

| Exp | Initiator | Catalyst/Ligand | [VC]:[I]:[C]:[L][a] | Time h | Mn | Conv % | Mw/Mn | Temp °C. | Solvent |
|---|---|---|---|---|---|---|---|---|---|
| 140 | Br—(CH$_3$)$_2$C—COOEt | Al(O)/bpy | 130:1:1.3:1.1 | 17 | 8,200 | 5 | 1.61 | 90 | xylene |
| 141 | Br—(CH$_3$)$_2$C—COOEt | Al$^i$Bu$_3$ | 130:1:1.14 | 19 | 12,800 | 30 | 1.68 | 90 | oDCB |
| 142 | Br—(CH$_3$)$_2$C—COOEt | Cd(O)/bpy | 130:1:1.2:1.1 | 22 | 14,000 | 14 | 1.65 | 90 | oDCB |
| 143 | Br—(CH$_3$)$_2$C—COOEt | Sm(O)/bpy | 130:1:1.2:1.4 | 19 | 11,400 | 11 | 1.64 | 90 | dioxane |
| 144 | Br—(CH$_3$)$_2$C—COOEt | Zn(O)/bpy | 130:1:1.2:1.6 | 20 | 14,400 | 15 | 1.68 | 90 | oDCB |
| 145 | Cl—CH(CN)—CH$_3$ | Cr(CO)$_6$ | 130:1:1.2 | 18 | 18,400 | 9 | 1.57 | 90 | oDCB |

[a] Molar ratio of VC to initiator to catalyst to ligand.

TABLE 6

Selected Examples of the Room Temperature Polymerization of Vinyl Chloride Catalyzed by Copper Catalysts in Water, Solvents and Mixtures Thereof.

| Exp | Initiator | Catalyst | [VC]/[I]/[C]/[L]/[S][a] | Mn | Mw/Mn | Time h | Conv % | Temp °C | Solvent |
|---|---|---|---|---|---|---|---|---|---|
| 146 | CH$_3$—CH(Cl)—I | Cu(O)/NH$_4$OH | 100/1/1/2 | 8,200 | 1.75 | 48 | 30 | 20 | NH$_4$OH |
| 147 | CH$_3$—CH(Cl)—I | Cu(O)/TREN | 100/1/2/4 | 13,500 | 1.60 | 20 | 67 | 20 | o-DCB |

TABLE 6-continued

Selected Examples of the Room Temperature Polymerization
of Vinyl Chloride Catalyzed by Copper Catalysts in Water, Solvents and Mixtures Thereof.

| Exp | Initiator | Catalyst | [VC]/[I]/[C]/[L]/[S]^p) | Mn | Mw/Mn | Time h | Conv % | Temp °C. | Solvent |
|---|---|---|---|---|---|---|---|---|---|
| 148 | $CH_3$—CH(Cl)—I | Cu(O)/TREN | 100/1/2/4 | 5,500 | 1.61 | 20 | 45 | 20 | $H_2O$ |
| 149 | $CH_3$—CH(Cl)—I | Cu(O)/TREN | 100/1/2/4 | 3,700 | 1.47 | 20 | 11 | 20 | THF |
| 150 | $CH_3$—CH(Cl)—I | Cu(O)/TREN | 100/1/2/4 | 4,700 | 1.57 | 16 | 26 | 20 | DMF |
| 151 | $CH_3$—CH(Cl)—I | Cu(O)/TREN | 100/1/2/2 | 11,500 | 1.60 | 20 | 75 | 20 | o-DCB |
| 152 | $CH_3$—CH(Cl)—I | Cu(O)/TREN/Brij-97 | 100/1/1/2 | 7,000 | 1.65 | 20 | 65 | 20 | o-DCB |
| 153 | $CH_3$—CH(Cl)—I | Cu(O)/TREN/Brij-97 | 100/1/2/4/0.5 | 5,500 | 1.91 | 20 | 54 | 20 | $H_2O$ |
| 154 | $CH_3$—CH(Cl)—I | Cu(O)/TREN/NaDDS | 100/1/2/4/0.5 | 13,200 | 1.54 | 20 | 95 | 20 | $H_2O$ |
| 155 | $CH_3$—CH(Cl)—I | Cu(O)/TREN/NaDDS | 100/1/2/4/0.5 | 2,600 | 1.91 | 1 | 8 | 20 | $H_2O$ |
| 156 | $CH_3$—CH(Cl)—I | Cu(O)/TREN/NaDDS | 100/1/2/4/0.5 | 4,350 | 1.65 | 2 | 27 | 20 | $H_2O$ |
| 157 | $CH_3$—CH(Cl)—I | Cu(O)/TREN/NaDDS | 100/1/2/4/0.5 | 6,440 | 1.56 | 4 | 55 | 20 | $H_2O$ |
| 158 | $CH_3$—CH(Cl)—I | Cu(O)/TREN/NaDDS | 100/1/2/4/0.5 | 8,300 | 1.47 | 8 | 62 | 20 | $H_2O$ |
| 159 | $CH_3$—CH(Cl)—I | Cu(O)/TREN/NaDDS | 500/1/2/4/0.5 | 24,000 | 1.60 | 48 | 51 | 20 | $H_2O$ |
| 160 | $CH_3$—CH(Cl)—I | $Cu_2O$/TREN/NaDDS | 100/1/2/4/0.5 | 12,500 | 2.43 | 20 | 81 | 25 | $H_2O$ |
| 161 | $CH_3$—CH(Cl)—I | $Cu_2S$/TREN/NaDDS | 100/1/2/4/0.5 | 3,700 | 1.57 | 20 | 40 | 25 | $H_2O$ |
| 162 | $CH_3$—CH(Cl)—I | $Cu_2Se$/TREN/NaDDS | 100/1/2/4/0.5 | 6,800 | 1.56 | 20 | 84 | 25 | $H_2O$ |
| 163 | $CH_3$—CH(Cl)—I | $Cu_2Te$/Cu(O)/TREN/NaDDS | 100/1/1/1/4/0.5 | 2,900 | 2.01 | 15 | 35 | 25 | $H_2O$ |
| 164 | $CH_3$—CH(Cl)—I | $Cu_2Te$/TREN/ | 100/1/2/4 | 5,500 | 1.81 | 15 | 44 | 25 | $H_2O$ |
| 165 | $CH_3$—CH(Cl)—I | $Cu_2Te$/TREN/Brij97 | 100/1/2/4/0.5 | 6,500 | 1.72 | 17 | 88 | 25 | $H_2O$ |
| 166 | $CH_3$—CH(Cl)—I | $Cu_2Te$/TREN/Brij98 | 100/1/2/4/0.5 | 8,600 | 1.75 | 17 | 98 | 25 | $H_2O$ |
| 167 | $CH_3$—CH(Cl)—I | $Cu_2Te$/TREN/NaDDS | 100/1/2/4/2.5 | 6,700 | 2.10 | 17 | 92 | 25 | $H_2O$ |
| 168 | $CH_3$—CH(Cl)—I | $Cu_2Te$/TREN/NaDDS | 100/1/2/4/1 | 8,100 | 1.68 | 17 | 96 | 25 | $H_2O$ |
| 169 | $CH_3$—CH(Cl)—I | $Cu_2Te$/TREN/NaDDS | 100/1/2/4/0.5 | 8,600 | 1.58 | 20 | 96 | 25 | $H_2O$ |
| 170 | $CH_3$—CH(Cl)—I | $Cu_2Te$/TREN/NaDDS | 100/1/2/4/0.5 | 7,900 | 2.14 | 14 | 93 | 25 | $H_2O$ |
| 171 | $CH_3$—CH(Cl)—I | $Cu_2Te$/TREN/NaDDS | 100/1/1/2/0.5 | 5,900 | 1.75 | 17 | 76 | 25 | $H_2O$ |
| 172 | $CH_3$—CH(Cl)—I | $Cu_2Te$/TREN/NaDDS | 100/1/2/4/0.1 | 5,500 | 1.76 | 17 | 69 | 25 | $H_2O$ |
| 173 | $CH_3$—CH(Cl)—I | CuBr/TREN/Brij 98 | 100/1/0.5/1/0.5 | 4,100 | 1.88 | 16 | 31 | 25 | $H_2O$ |
| 174 | $CH_3$—CH(Cl)—I | CuCl/TREN/Brij 98 | 100/1/1/1.5/0.5 | 8,500 | 1.86 | 48 | 73 | 20 | $H_2O$ |
| 175 | $CH_3$—CH(Cl)—I | CuCl/TREN/Brij-97 | 100/1/2/4/0.5 | 19,700 | 2.02 | 20 | 84 | 20 | $H_2O$ |
| 176 | $CH_3$—CH(Cl)—I | CuCl/TREN/NaDDS | 100/1/2/4/0.5 | 15,500 | 2.20 | 20 | 67 | 20 | $H_2O$ |
| 177 | $CH_3$—CH(Cl)—I | CuCl/TREN/Brij-97 | 100/1/2/4/0.5 | 20,800 | 1.97 | 20 | 13 | 20 | $H_2O$ |
| 178 | $CH_3$—CH(Cl)—I | CuSPh/TREN/NaDDS | 100/1/2/4/ | 5500 | 1.80 | 18 | 60 | 25 | $H_2O$ |
| 179 | $CHI_3$ | Cu(O)/PMDETA/NaDDS | 100/1/2/4 | 3500 | 1.59 | 21 | 18 | 25 | $H_2O$ |
| 180 | $CHI_3$ | Cu(O)/TREN/ | 100/1/2/4 | 8330 | 5.32 | 87 | 70 | 25 | MeOH |
| 181 | $CHI_3$ | Cu(O)/TREN/$(CH_3)_3NC_{16}H_{33}Cl$ | 100/1/2/4/0.5 | 1,000 | 1.47 | 13 | 5 | 25 | $H_2O$ |
| 182 | $CHI_3$ | Cu(O)/TREN/NaDDS | 1000/1/100/100/5 | 25,000 | 2.20 | 16 | 23 | 25 | $H_2O$ |
| 183 | $CHI_3$ | Cu(O)/TREN/NaDDS | 1000/1/100/100/5 | 36,000 | 3.66 | 87 | 65 | 25 | $H_2O$ |
| 184 | $CHI_3$ | Cu(O)/TREN/NaDDS | 800/1/30/30/4 | 43,000 | 2.29 | 66 | 90 | 25 | $H_2O$ |
| 185 | $CHI_3$ | Cu(O)/TREN/NaDDS | 800/1/15/15/4 | 33,500 | 2.44 | 66 | 60 | 25 | $H_2O$ |
| 186 | $CHI_3$ | Cu(O)/TREN/NaDDS | 200/1/4/8/2 | 14,900 | 1.63 | 20 | 63 | 20 | $H_2O$ |
| 187 | $CHI_3$ | Cu(O)/TREN/NaDDS | 100/1/8/8/0.5 | 10,600 | 1.57 | 13 | 94 | 25 | $H_2O$ |
| 188 | $CHI_3$ | Cu(O)/TREN/NaDDS | 300/1/6/9/1.5 | 5,800 | 1.77 | 16 | 19 | 25 | MeOH |
| 189 | $CHI_3$ | Cu(O)/TREN/NaDDS | 100/1/4/4/0.5 | 8,400 | 1.72 | 17 | 88 | 25 | $H_2O$ |
| 190 | $CHI_3$ | Cu(O)/TREN/NaDDS | 100/1/2/4/0.5 | 1,300 | 1.22 | 17 | 8 | 25 | MeOH |
| 191 | $CHI_3$ | Cu(O)/TREN/NaDDS | 100/1/2/4/0.5 | 1100 | 1.55 | 1 | 10 | 25 | $H_2O$ |
| 192 | $CHI_3$ | Cu(O)/TREN/NaDDS | 100/1/2/4/0.5 | 1358 | 1.58 | 2 | 20 | 25 | $H_2O$ |
| 193 | $CHI_3$ | Cu(O)/TREN/NaDDS | 100/1/2/4/0.5 | 1728 | 1.58 | 4 | 25 | 25 | $H_2O$ |
| 194 | $CHI_3$ | Cu(O)/TREN/NaDDS | 100/1/2/4/0.5 | 1,970 | 1.56 | 7 | 28 | 25 | $H_2O$ |
| 195 | $CHI_3$ | Cu(O)/TREN/NaDDS | 100/1/2/4/0.5 | 2,800 | 1.54 | 14 | 39 | 25 | $H_2O$ |
| 196 | $CHI_3$ | Cu(O)/TREN/NaDDS | 100/1/2/4/0.5 | 5500 | 1.57 | 24 | 69 | 25 | $H_2O$ |
| 197 | $CHI_3$ | Cu(O)/TREN/NaDDS | 100/1/2/4/0.5 | 8400 | 1.81 | 62 | 99 | 25 | $H_2O$ |
| 198 | $CHI_3$ | Cu(O)/TREN/NaDDS | 100/1/2/4/0.5 | 7,263 | 1.79 | 37 | 93 | 25 | $H_2O$ |
| 199 | $CHI_3$ | Cu(O)/TREN/NaDDS | 100/1/2/4/0.5 | 8,100 | 1.83 | 50 | 99 | 25 | $H_2O$ |
| 200 | $CHI_3$ | Cu(O)/TREN/NaDDS | 100/1/2/4/0.5 | 9,300 | 1.70 | 16 | 31 | 25 | Acetone |
| 201 | $CHI_3$ | Cu(O)/TREN/NaDDS | 100/1/2/4/0.5 | 10,500 | 1.80 | 15 | 60 | 25 | EtOAc |
| 202 | $CHI_3$ | Cu(O)/TREN/NaDDS | 100/1/2/4/0.5 | 8293 | 1.80 | 41 | 99 | 25 | $H_2O$ |
| 203 | $CHI_3$ | Cu(O)/TREN/NaDDS | 100/1/2/4/0.5 | 7980 | 1.74 | 30 | 94 | 25 | $H_2O$ |
| 204 | $CHI_3$ | Cu(O)/TREN/NaDDS | 800/1/6/6/0.5 | 6,900 | 1.77 | 13 | 7 | 25 | $H_2O$ |
| 205 | $CHI_3$ | Cu(O)/TREN/NaDDS | 100/1/2/4/0.25 | 9,650 | 2.28 | 68 | 88 | 25 | 1/1 MeOH/$H_2O$ |
| 206 | $CHI_3$ | Cu(O)/TREN/NaDDS | 100/1/2/4/0.25 | 13,000 | 1.91 | 68 | 96 | 25 | 1/1 THF/$H_2O$ |
| 207 | $CHI_3$ | Cu(O)/TREN/NaDDS | 100/1/2/4/0.25 | 11,400 | 1.57 | 15 | 96 | 25 | 1/1 THF/$H_2O$ |
| 208 | $CHI_3$ | Cu(O)/TREN/NaDDS | 100/1/112/0.5 | 2,600 | 1.37 | 17 | 35 | 25 | $H_2O$ |
| 209 | $CHI_3$ | Cu(O)/TREN/NaDDS | 100/1/0.5/1/0.5 | 1,700 | 1.35 | 17 | 26 | 25 | $H_2O$ |
| 210 | $CHI_3$ | Cu(O)/TREN/NaDDS | 100/1/0.5/1/0.5 | 5700 | 1.76 | 87 | 87 | 25 | $H_2O$ |
| 211 | $CHI_3$ | Cu(O)/TREN/THF | 100/1/2/4/0 | 11,100 | 1.55 | 15 | 98 | 25 | 1/1 THF/$H_2O$ |
| 212 | $CHI_3$ | $Cu_2Te$/Cu(O)/TREN/NaDDS | 100/1/1/1/4/0.5 | 5,400 | 1.45 | 15 | 65 | 25 | $H_2O$ |
| 213 | $CHI_3$ | $Cu_2Te$/CuBr/TREN/Brij98/NaDDS | 100/1/1/1/4/0.25/0.25 | 11,200 | 1.58 | 14 | 99 | 25 | THF/$H_2O$ 1/1 |
| 214 | $CHI_3$ | $Cu_2Te$/TREN/NaDDS | 100/1/8/8/0.5 | 8,200 | 1.75 | 14 | 99 | 25 | $H_2O$ |
| 215 | $CHI_3$ | $Cu_2Te$/TREN/NaDDS | 100/1/6/6/0.5 | 2,600 | 1.53 | 14 | 54 | 25 | $H_2O$ |
| 216 | $CHI_3$ | $Cu_2Te$/TREN/NaDDS | 100/1/4/4/0.5 | 8,000 | 1.78 | 14 | 98 | 25 | $H_2O$ |

TABLE 6-continued

Selected Examples of the Room Temperature Polymerization
of Vinyl Chloride Catalyzed by Copper Catalysts in Water, Solvents and Mixtures Thereof.

| Exp | Initiator | Catalyst | [VC]/[I]/[C]/[L]/[S][a] | Mn | Mw/Mn | Time h | Conv % | Temp °C. | Solvent |
|---|---|---|---|---|---|---|---|---|---|
| 217 | CHI$_3$ | Cu$_2$Te/TREN/NaDDS | 100/1/2/4/0.5 | 5,900 | 1.55 | 13 | 80 | 25 | H$_2$O |
| 218 | CHI$_3$ | Cu$_2$Te/TREN/NaDDS | 100/1/2/4/0.3 | 11,600 | 1.53 | 14 | 99 | 25 | THF/H$_2$O 1/2 |
| 219 | CHI$_3$ | Cu$_2$Te/TREN/NaDDS | 100/1/2/4/0.25 | 6100 | 1.59 | 14 | 82 | 25 | o-DCB/H$_2$O 1/1 |
| 220 | CHI$_3$ | Cu$_2$Te/TREN/NaDDS | 100/1/1/2/0.5 | 3,300 | 1.38 | 15 | 45 | 25 | H$_2$O |
| 221 | CHI$_3$ | Cu$_2$Te/TREN/NaDDS | 100/1/1/2/0.5 | 1192 | 1.70 | 2 | 14 | 25 | H$_2$O |
| 222 | CHI$_3$ | Cu$_2$Te/TREN/NaDDS | 100/1/1/2/0.5 | 2585 | 1.57 | 4 | 38 | 25 | H$_2$O |
| 223 | CHI$_3$ | Cu$_2$Te/TREN/NaDDS | 100/1/1/2/0.5 | 7883 | 1.82 | 24 | 99 | 25 | H$_2$O |
| 224 | CHI$_3$ | Cu$_2$Te/TREN/NaDDS | 100/1/0.5/1/0.5 | 5,000 | 1.45 | 64 | 66 | 25 | H$_2$O |
| 225 | CHI$_3$ | Cu$_2$Te/TREN/NaDDS | 100/1/0.1/0.5/0.5 | 850 | 1.43 | 64 | 17 | 25 | H$_2$O |
| 226 | CHI$_3$ | Cu$_2$Te/TREN/NaDDS | 100/1/0.1/0.2/0.5 | 920 | 1.42 | 64 | 11 | 25 | H$_2$O |
| 227 | CHI$_3$ | Cu$_2$Te/TREN/NaDDS | 100/1/0.05/0.1/0.5 | 670 | 1.30 | 64 | 2 | 25 | H$_2$O |
| 228 | CF$_3$—(CF$_2$)$_9$—I | Cu(O)/TREN/Brij-97 | 100/1/2/4/0.5 | 5,900 | 1.66 | 20 | 64 | 20 | H$_2$O |
| 229 | CH$_2$=CH—CH$_2$—I | Cu(O)/bpy | 100/1/2/4 | 12,000 | 1.88 | 20 | 5 | 20 | o-DCB |
| 230 | BrC(CH$_3$)$_2$—COOPh—Ph—OCO—C(CH$_3$)$_2$Br | Cu(O)/TREN/NaDDS | 200/1/4/8/1 | 65,000 | 1.92 | 20 | 61 | 20 | H$_2$O |
| 231 | CH$_3$C[Ph—OCO—C(CH$_3$)$_2$Br]$_3$ | Cu(O)/TREN/NaDDS | 300/1/3/4.5 | 65,000 | 1.70 | 20 | 18 | 20 | H$_2$O |
| 232 | Cl—CH$_2$—Ph—CH$_2$—Cl | CuCl/TREN/Brij 97 | 50/1/2/3/0.5 | 62,300 | 1.95 | 20 | 56 | 20 | H$_2$O |
| 233 | I—CH$_2$—Ph—CH$_2$—I | Cu(O)/TREN/NaDDS | 260/1/4/8/1.3 | 22,700 | 1.55 | 20 | 13 | 20 | H$_2$O |
| 234 | Ph—CO—O—O—CO—Ph | CuCl/TREN/Brij 97 | 100/1/1.5/1 | 53,100 | 1.99 | 20 | 62 | 20 | H$_2$O |
| 235 | PVC, Mn = 5100, Mw/Mn = 1.6 | Cu(O)/TREN/NaDDS | 740/1/2/4/0.5 | 29,800 | 2.62 | 20 | 52 | 20 | H$_2$O |
| 236 | PVC, Mn = 22,000, Mw/Mn = 2.2 | Cu(O)/TREN/NaDDS | 1440/1/10/20 | 55,700 | 2.94 | 20 | 20 | 20 | H$_2$O |

[a]Molar ratio of VC to initiator to catalyst to ligand to surfactant.

Table 1 presents selected examples of Fe(0) catalyzed VC polymerization. Examples 1 to 9 describe the initiation performed from α-haloesters. Example 9 describes the synthesis of a block copolymer by initiating from the Cl chain end of PMMA synthesized via living radical polymerization. Examples 10 to 16 describe the VC polymerization initiated from benzyl halides and pseudohalides, while examples 17 and 18 exemplify α-cyanoesters and example 19 describes the use of sulfonyl halides as initiators. The polymerization may be performed in o-DCB, THF or DMF. In o-DCB, at constant [VC]:[I]:[C]:[L] ratios, lower temperatures lead to higher molecular weights and narrower Mw/Mn but lower conversions (#4–6).

Table 2 presents the TiCp$_2$Cl$_2$ catalyzed polymerization of VC initiated from various halides. By itself, in the absence of added initiator, TiCp$_2$Cl$_2$ catalyzes VC polymerization only to very low conversion. Polymers can be obtained in the presence of α-haloesters (examples 21 to 25), benzy halides and pseudohalides (examples 26 to 31), α-cyanoesters (example 32) as well as imidyl halides (examples 33 and 34). The addition of Al$^i$Bu$_3$ (examples 23 and 25) significantly increase the conversion. Star polymers can be synthesized in the presence of trifunctional initiators (example 27). Lower temperature affords higher Mn but lower conversion (examples 21 and 22). For Ti based catalysts, bhlorine and bromine containing initiators generate higher conversions than iodine initiators and are therefore preferred.

Table 3 presents the Cu(I) catalyzed polymerization of VC initiated from various halides. In the presence of more activating ligands than bpy, such as Me$_6$-TREN, CuBr can catalyzed VC polymerization initiated from α-haloesters (examples 37 and 38). More reactive Cu(I) species such as CuC≡C—Ph, CuSPh or Cu$_2$Te (examples 39, 40 and 46) can catalyze VC polymerization even in the presence of bpy as ligand. For the less reactive copper halides, the presence of more activating polyamine ligands is therefore necessary.

Table 4 presents the Cu(0) catalyzed polymerization of VC initiated from various halides. Initiation from allyl chloride defects is demonstrated using various haloallyl model compounds (examples 48–50), while the initiation from the repeat unit of PVC is demonstrated with the corresponding 1,1-dichloro (example 53), 1,1-chlorobromo (example 67) and 1,1-chloroiodo derivatives (examples 92 to 117). Cu(0) is also able to catalyze VC polymerization in the presence of a large variety of chloro, bromo and iodo initiators such as α-cyanohalides (examples 51 and 52), α-haloesters (examples 57–59, 61–66 and 72–74) and various benzyl halides such as α,α'-dichloro-p-xylene (examples 54–56), α,α'-dibromo-p-xylene (example 70) 1-bromo-1-phenylethane (examples 68 and 69) and 1,2,4,5-tetrakisbromomethyl benzene (example 60, star polymer), and α,α'-diiodo-p-xylene (examples 118 to 137). Other successful initiators include perfloroalkyliodides (example 75), allyl iodide (examples 76 to 79), iodoform (examples 80 to 89) and carbon tetraiodide (examples 90 and 91).

Figure 2:
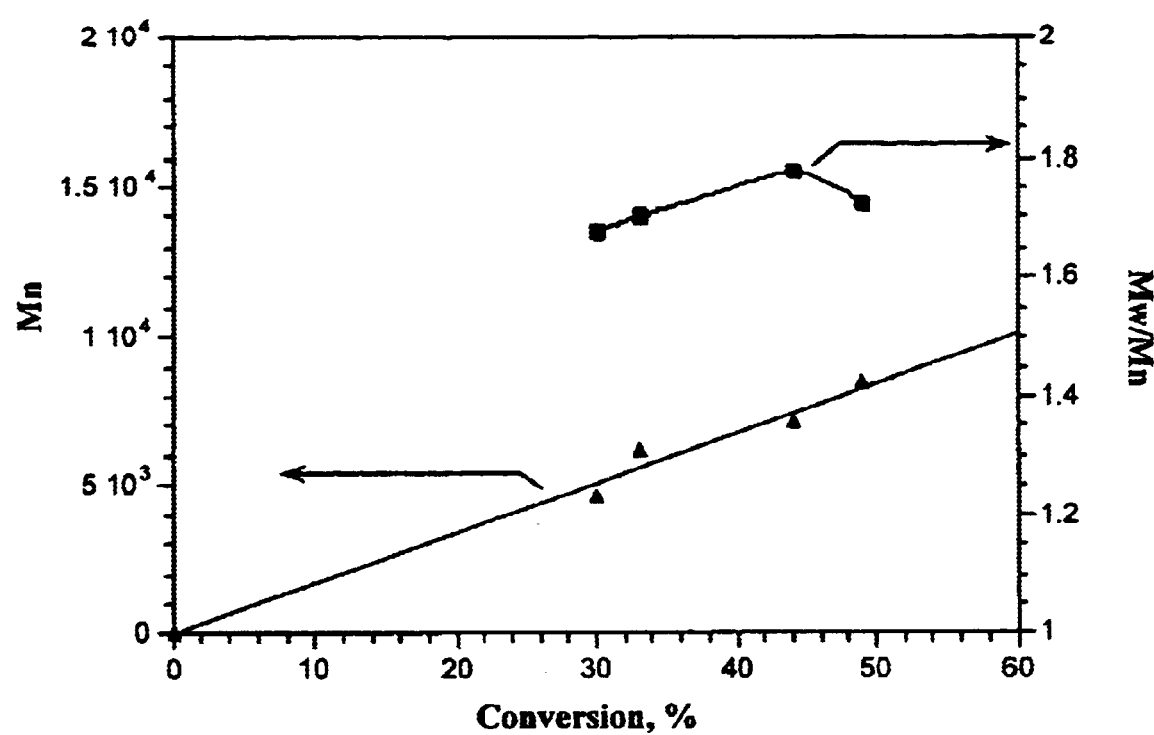
FIG. 2 is an illustration of The dependence of molecular weight (▲) and molecular weight distribution (■) on conversion for the polymerization of VC initiated from $CH_3$-CHCI-1 and catalyzed by Cu(O)/bpy in water at 90° C. in the presence of sodium dodecylsulfate (NaDDS). [VC]:[$CH_3$CHCl1]:[Cu(O)]:[bpy]:[NaDDS]=100:1:2:4:0.5.

The experiments described in examples 125–132 are plotted in FIG. 1 and show that the molecular weight increases linearly with conversion while the polydispersity decreases with conversion at 130° C. using o-DCB as solvent. A linear (FIG. 2) dependence between molecular weight and conversion is observed (examples 114–117) even at 90° C. if VC polymerization is carried out in water in the presence of a surfactant (sodium dodecylsulfate).

Figure 3:
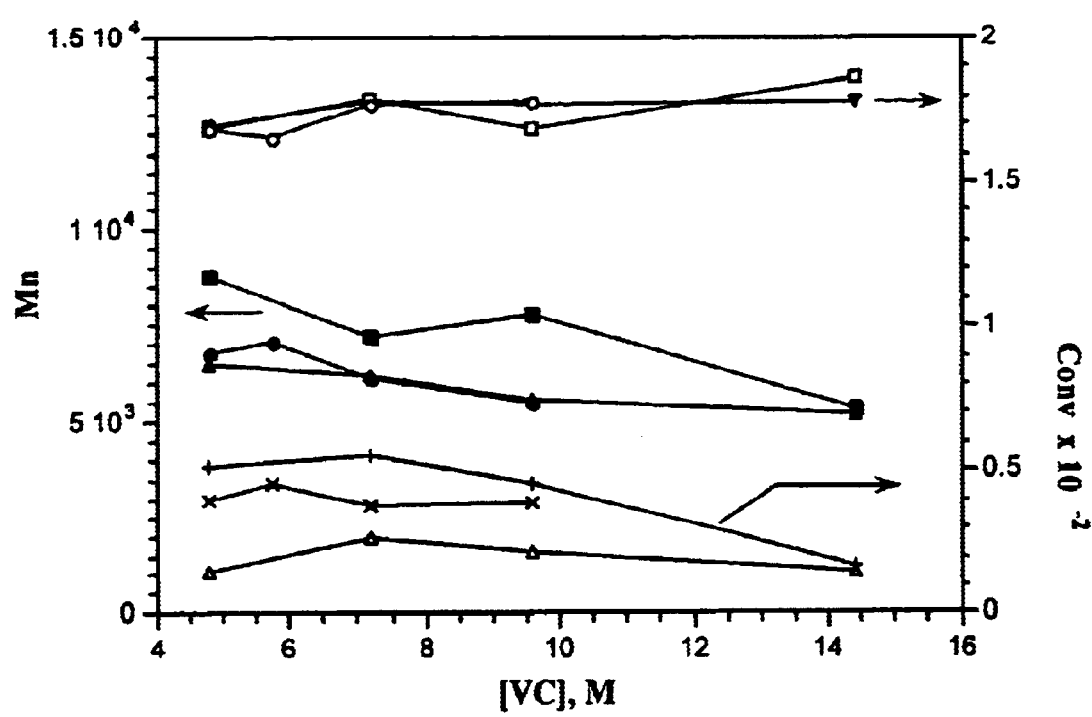
FIG. 3 is an illustration of the dependence of molecular weight, molecular weight distribution and conversion on temperature and concentration for the polymerization of VC initiated from $CH_3$CHCl-1 and catalyzed by Cu(O)/bpy in bulk and in o-DCB at 60° C. (▲,▼,Δ), 90° C. (■,□,+) and 130° C. (●,○,×). [VC]:[$CH_3$CHCl1]:[Cu(O)]:[bpy]=100:1:2:4.

The results from examples 97 to 108 describe the combined effect of VC concentration (from bulk 14.4 M to solution 4.8 M) and temperature (from 60° C. to 130° C.) on the molecular weight distribution and conversion of the resulting PVC for a reaction time of 20 h and are presented in FIG. 3. An optimum conversion is observed for [VC]=7.2 M, while bulk polymerization generates both lower conversion as well as lower molecular weight and broader molecular weight distribution.

Table 5 presents miscellaneous examples of metal catalyzed VC polymerization. It was observed that α-haloesters catalyze VC polymerization (examples 140–144) in the presence of Al(0)/bpy and Al$^i$Bu$_3$ as well as Cd(0)/bpy, Sm(0)/bpy and Zn(0)/bpy. α-Cyanohalides (example 145) can catalyze VC polymerization in the presence of Cr(CO)$_6$.

Figure 4:
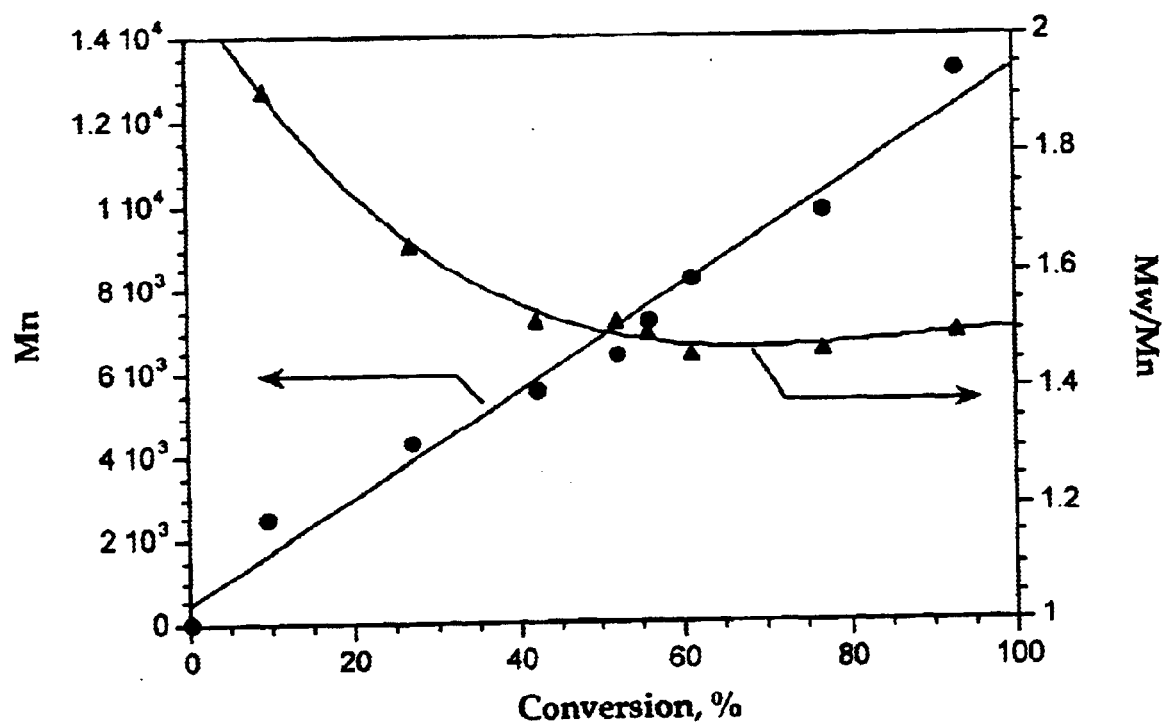
FIG. 4 is an illustration of the dependence of molecular weight (●) and molecular weight distribution (▲) on conversion for the polymerization of VC initiated from $CH_3$CHCl-1 and catalyzed by Cu(O)/TREN in water at 20° C. in the presence of sodium dodecyclsulfate (NaDDS). [VC]:[$CH_3$CHCl1]:[Cu(O)]:[bpy]:[NaDDS]=100:1:2:4:0.5.

Table 6 presents selected examples of the room temperature metal catalyzed VC polymerization in water, organic solvents or mixtures thereof. In the presence of activating ligands such as TREN, Cu(0) and its derivatives are successful in polymerizing VC at room temperature. Particularly suitable initiators include iodine derivatives such as CH$_3$—CH(Cl)—I (example 147 to example 178), CHI$_3$ (example 179 to example 227), CF$_3$—(CF$_2$)$_9$—I (example 228), CH$_2$=CH—CH$_2$—I (example 229) and I—CH$_2$—Ph—CH$_2$—I (example 233). A demonstration of the Cu(0)/TREN catalyzed living radical polymerization of VC at room temperature initiated from CH$_3$—CH(Cl)—I in water is presented in FIG. 4. A linear dependence between molecular weight and conversion is observed up to complete conversion of VC. Initiators that generate high Mn PVC at room temperature are also bromine and chlorine containing initiators such as BrC(CH$_3$)$_2$—COO—Ph—Ph—OCO—C(CH$_3$)$_2$Br (example 230) or CH$_3$C[Ph—OCO—C(CH$_3$)$_2$Br]$_3$ (example 231 in which case a star PVC polymer was obtained) or Cl—CH$_2$—Ph—CH$_2$—Cl(example 232). Low Mn PVC synthesized by living radical polymerization (example 235) can be chain-extended with VC in water while commercial PVC (example 236) can be grafted in water with VC under the same conditions. Very suitable catalytic systems include Cu(0)/TREN, Cu$_2$Te/TREN and combinations thereof. By contrast, with the solution experiments performed with CuX (X=Cl, Br, I) at higher temperatures, the CuX/TREN catalytic systems are active in water even at room temperature (examples 173–177, 232). A conventional initiator such as benzoyl peroxide can be employed as well (example 234). The polymerization can also be carried out at room temperature in various organic solvents such as o-DCB, THF, Acetone, Ethyl Acetate, MeOH, etc or mixtures water/organic solvent in which case the presence of the surfactant may be not be necessary.

The following examples show ways in which the invention can be practiced, as well as comparative examples. However, the examples do not limit the invention.

EXAMPLES OF PREPARATION OF THE CHLORINE CONTAINING POLYMER

The polymerizations reported were performed as follows unless otherwise noted: A 50 mL Ace Glass 8648 #15 Ace-Thred pressure tube equipped with bushing and plunger valve containing solvent (ortho-dichlorobenzene, 10 mL), initiator catalyst, ligand, optional additive and vinyl chloride (5 mL, 0.072 mol), was degassed by three freeze-vacuum pump-thaw cycles was filled with argon. The reaction mixture was slowly heated to the specific reaction temperature in an oil bath. After the specific reaction time, the tube was slowly cooled and excess vinyl chloride was allowed to boil off. Methylene chloride (10 mL) was added and the solution was precipitated into methanol, filtered and dried. The conversion was determined gravimetrically and the number average molecular weight (Mn) and molecular weight distribution (Mw/Mn) were determined by gel permeation chromatography using a calibration based on polystyrene standards. GPC analysis of the polymers was performed on a Perkin-Elmer Series 10 high pressure liquid chromatograph equipped with an LC-100 column oven (22° C.), a Nelson Analytical 900 Series integrator data station, a Perkin-Elmer 785A UV/Visible Detector (254 nm), a Varian Star 4090 RI detector and 2 AM gel (10 μm, 500 Å and 10 μm, 10$^4$ Å) columns. THF (Fisher, HPLC-grade) was used as eluent at a flow rate of 1 mL/min.

A number of polymerization reactions were produced in accordance with the above description. Selected examples from the Tables 1–6 are presented below:

Table 1, Example 1

A 50 mL Ace Glass 8648 #15 Ace-Thred pressure tube equipped with bushing and plunger valve containing vinyl chloride (5 mL, 0.072 mol), solvent (ortho-dichlorobenzene (o-DCB), 10 mL), initiator (ethyl 2-bromoisobutyrate, 223 mg, 1.12 mmol), catalyst (Fe(0), 40 mg, 0.7 mmol) and ligand (phen 200 mg, 1.1 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 1.17 g (26%) of PVC, Mn=10,000, Mw/Mn=1.66.

Table 1, Example 9

A 50 mL Ace Glass 8648 #15 Ace-Thred pressure tube equipped with bushing and plunger valve containing vinyl chloride (5 mL, 0.072 mol), solvent (o-DCB, 10 mL), initiator (chlorine terminated poly(methylmethacrylate) PMMA—CH$_2$—C(COOMe)(CH$_3$)—Cl, Mn=6,300, Mw/Mn=1.25, 1g, 0.16 mmol), catalyst (Fe(0), 40 mg, 0.7 mmol) and ligand (phen 100 mg, 0.55 mmol) was degassed by three freeze-vacuum pump-thaw cycles and filled with argon. The reaction mixture was slowly heated to 90 ° C. in an oil bath. After 20 hours, the tube was slowly cooled and excess vinyl chloride was allowed to boil off. Methylene chloride (20 mL) was added and the solution was precipitated into methanol, filtered and dried to yield 3.5 g (35%) of PVC, Mn=8,300, Mw/Mn=1.73.

Table 1, Example 18

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-1-cyanoethane, 79 mg, 0.56 mmol), catalyst (Fe(CO)$_5$, 133 mg, 0.68 mmol) was degassed by three freeze-vacuum pump-thaw cycles and filled with argon. The reaction mixture was slowly heated to 90° C. in an oil bath. After 18 hours, the tube was slowly cooled and excess vinyl chloride was allowed to boil off. Methylene chloride (10 mL) was added and the solution was precipitated into methanol, filtered and dried to yield 0.23 g (4%) of PVC, Mn=14,300, Mw/Mn=1.65.

Table 1, Example 19

A 50 mL Ace Glass 8648 #15 Ace-Thred pressure tube equipped with bushing and plunger valve containing vinyl chloride (5 mL, 0.072 mol), solvent (o-DCB, 10 mL), initiator (4-florobenzenesulfonyl chloride 132 mg, 0.56 mmol), catalyst (Fe(0), 40 mg, 0.7 mmol) ) and ligand (phen 200 mg, 1.12 mmol) was degassed by three freeze-vacuum pump-thaw cycles and filled with argon. The reaction mixture was slowly heated to 90° C. in an oil bath. After 18 hours, the tube was slowly cooled and excess vinyl chloride was allowed to boil off. Methylene chloride (10 mL) was added and the solution was precipitated into methanol, filtered and dried to yield 1 g (22%) of PVC, Mn=14,300, Mw/Mn=1.82.

Table 2, Example 21

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol) and catalyst (TiCp$_2$Cl$_2$, 167 mg, 0.67 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.47 g (10%) of PVC, Mn=14,300, Mw/Mn=1.82.

Table 2, Example 23

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (TiCp$_2$Cl$_2$, 167 mg, 0.6 mmol) and additive (Al$^i$Bu$_3$, 2 mmol, 2 mL 1 M in toluene) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 2.8 g (60%) of PVC, Mn=3,800, Mw/Mn=2.10.

Table 2, Example 24

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (TiCp$_2$Cl$_2$, 167 mg, 0.6 mmol), additive (Zn(0), 65 mg, 1 mmol) and ligand (bpy 100 mg, 0.4 mmol) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 1 g (22%) of PVC, Mn=14,800, Mw/Mn=1.95.

Table 2, Example 25

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (Ti(OBu)$_4$, 231 mg, 0.7 mmol), additive (Al$^i$Bu$_3$, 2 mmol, 2 mL 1M in toluene) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 4 g (88%) of PVC, Mn=14,800 Mw/Mn=1.95.

Table 2, Example 29

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-dichloro-p-xylene, 25 mg 0.14 mmol) and catalyst (TiCp$_2$Cl$_2$, 70 mg, 0.28 mmol), was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.25 g (28%) of PVC, Mn=4,900, Mw/Mn=1.81.

Table 2, Example 33

A 50 mL Ace Glass 8648 #15 Ace-Thred pressure tube equipped with bushing and plunger valve containing vinyl chloride (5 mL, 0.072 mol), solvent (o-DCB, 10 mL), initiator (N-bromosuccinimide, 100 mg 0.56 mmol) and catalyst (TiCp$_2$Cl$_2$, 170 mg, 0.68 mmol), was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.2 g (4%) of PVC, Mn=19,000 Mw/Mn=1.78.

Table 2, Example 34

A 50 mL Ace Glass 8648 #15 Ace-Thred pressure tube equipped with bushing and plunger valve containing vinyl chloride (5 mL, 0.072 mol), solvent (o-DCB, 10 mL), initiator (trichloroisocyanuric acid, 100 mg, 0.56 mmol) and catalyst (TiCp$_2$Cl$_2$, 170 mg, 0.68 mmol), was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.2 g (4%) of PVC, Mn=19,000, Mw/Mn=1.80.

Table 2, Example 35

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,1,1-tris(4-chlorosulfonylphenyl)ethane, 100 mg, 0.18 mmol) and catalyst (TiCp$_2$Cl$_2$, 400 mg, 1.6 mmol), was degassed by three freeze-vacuum pump-thaw cycles and filled with argon. The reaction mixture was slowly heated to 110° C. in an oil bath. After 22 hours, the tube was slowly cooled and excess vinyl chloride was allowed to boil off. Methylene chloride (10 mL) was added and the solution was precipitated into methanol, filtered and dried to yield 0.35 g (7%) of PVC, Mn=4,000 Mw/Mn=2.05.

Table 3, Example 39

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 64 mg, 0.72 mmol) catalyst (copper phenylacetylide, 178 mg, 1.1 mmol) and ligand (bpy, 337 mg, 2.16 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.67 g (15%) of PVC, Mn=1,300, Mw/Mn=3.60.

Table 3, Example 40

A 50 mL Ace Glass 8648 #15 Ace-Thred pressure tube equipped with bushing and plunger valve containing vinyl chloride (5 mL, 0.072 mol), solvent (DMF, 5 mL), initiator (1-chloro-1-cyanoethane, 51 mg, 0.56 mmol) catalyst (copper thiophenoxide, 69 mg, 0.4 mmol) and ligand (bpy, 337 mg, 2.16 mmol) was degassed by three freeze-vacuum pump-thaw cycles and filled with argon. The reaction mixture was slowly heated to 60° C. in an oil bath. After 19 hours, the tube was slowly cooled and excess vinyl chloride was allowed to boil off. Methylene chloride (10 mL) was added and the solution was precipitated into methanol, filtered and dried to yield 0.6 g (13%) of PVC, Mn=2,800, Mw/Mn=3.60.

Table 3, Example 41

A 50 mL Ace Glass 8648 #15 Ace-Thred pressure tube equipped with bushing and plunger valve containing vinyl chloride (5 mL, 0.072 mol), solvent (o-DCB, 5 mL), initiator (1-chloro-1-iodoethane, 53 mg, 0.28 mmol) catalyst (copper (I) bromide, 61 mg, 0.42 mmol) and ligand (tris[2-(dimethylamino)ethyl]amine ($Me_6$-TREN), 193 mg, 0.84 mmol) was degassed by three freeze-vacuum pump-thaw cycles and filled with argon. The reaction mixture was slowly heated to 90° C. in an oil bath. After 44 hours, the tube was slowly cooled and excess vinyl chloride was allowed to boil off. Methylene chloride (10 mL) was added and the solution was precipitated into methanol, filtered and dried to yield 0.22 g (5%) of PVC, Mn=3,200, Mw/Mn=1.30.

Table 3, Example 46

A 50 mL Ace Glass 8648 #15 Ace-Thred pressure tube equipped with bushing and plunger valve containing vinyl chloride (5 mL, 0.072 mol), solvent (o-DCB, 5 mL), initiator ($\alpha,\alpha'$-dithiocyanato-p-xylene, 61 mg, 0.28 mmol) catalyst (copper (I) telluride, 285 mg, 1.12 mmol) and ligand (bpy, 350 mg, 1.36 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 0.36 g (8%) of PVC, Mn=5,100, Mw/Mn=2.23.

Table 4, Example 48

A 50 mL Ace Glass 8648 #15 Ace-Thred pressure tube equipped with bushing and plunger valve containing vinyl chloride (5 mL, 0.072 mol), solvent (o-DCB, 10 mL), initiator (3-chloro-2-chloromethylpropene, 90 mg, 0.72 mmol) catalyst (copper, 184 mg, 2.8 mmol) and ligand (bpy, 898 mg, 5.76 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.4 g (31%) of PVC, Mn=7,700, Mw/Mn=1.85.

Table 4, Example 49

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-methyl-2-butene, 75 mg, 0.72 mmol) catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.9 g (20%) of PVC, Mn=8,300, Mw/Mn=1.62.

Table 4, Example 49

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-methyl-2-butene, 75 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.9 g (20%) of PVC, Mn=8,300, Mw/Mn=1.62.

Table 4, Example 50

A 50 mL Ace Glass 8648 #15 Ace-Thred pressure tube equipped with bushing and plunger valve containing vinyl chloride (5 mL, 0.072 mol), solvent (o-DCB, 10 mL), initiator (allyl chloride, 55 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (27%) of PVC, Mn=6,100, Mw/Mn=1.83.

Table 4, Example 53

A 50 mL Ace Glass 8648 #15 Ace-Thred pressure tube equipped with bushing and plunger valve containing vinyl chloride (5 mL, 0.072 mol), solvent (o-DCB, 10 mL), initiator (methylene chloride, 61 mg, 0.72 mmol), catalyst (copper, 92 mg, 1.4 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.25 g (5%) of PVC, Mn=50,000, Mw/Mn=2.75.

Table 4, Example 55

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-dichloro-p-xylene, 12 mg, 0.07 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.8 g (18%) of PVC, Mn=22,400, Mw/Mn=1.53.

Table 4, Example 56

A 50 mL Ace Glass 8648 #15 Ace-Thred pressure tube equipped with bushing and plunger valve containing vinyl chloride (2.5 mL, 0.036 mol), solvent (o-DCB, 5 mL), initiator (α,α'-dichloro-p-xylene, 105 mg, 0.6 mmol), catalyst (copper, 307 mg, 0.48 mmol) and ligand (bpy, 750 mg, 0.48 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the mixture was precipitated into methanol, filtered and dried to yield 2.3 g (95%) of PVC.

Table 4, Example 57

A 50 mL Ace Glass 8648 #15 Ace-Thred pressure tube equipped with bushing and plunger valve containing vinyl chloride (5 mL, 0.072 mol), solvent (o-DCB, 10 mL), initiator (2-bromo-2-methylpropionyl bromide, 64 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.5 g (12%) of PVC, Mn=17,000, Mw/Mn=1.90.

Table 4, Example 59

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.6 mmol), catalyst (copper, 40 mg, 0.6 mmol) ligand (bpy, 150 mg, 0.96 mmol) and additive ($Al^iBu_{3, 0.6}$ mmol, 0.6 mL 1M in toluene) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 3.5 g (77%) of PVC, Mn=6,400, Mw/Mn=1.85.

Table 4, Example 60

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,2,4,5-tetrakis(bromomethyl)benzene, 16 mg, 0.035 mmol), catalyst (copper, 18 mg, 0.28 mmol) and ligand (bpy, 87 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.3 g (7%) of PVC, Mn=23,700, Mw/Mn=1.58.

Table 4, Example 61

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-bromo-2-methyl-(1-methylethylidene)-di-4,1-phenylene ester 150 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 1.7 g (35%) of PVC, Mn=6,300, Mw/Mn=1.45.

Table 4, Example 65

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-bromo-2-methyl-4,4'-biphenylene ester 135 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 1.35 g (31%) of PVC, Mn=5,600, Mw/Mn=1.48.

Table 4, Example 67

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-1-bromoethane 103 mg, 0.72 mmol), catalyst (copper, 92 mg, 1.44 mmol) and ligand (bpy, 450 mg, 2.9 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.79 g (40%) of PVC, Mn=6,000, Mw/Mn=2.30.

Table 4, Example 70

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-dibromo-p-xylene 33 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.95 g (43%) of PVC, Mn=11,000, Mw/Mn=1.63.

Table 4, Example 72

A 50 mL Ace Glass 8648 #15 Ace-Thred pressure tube equipped with bushing and plunger valve containing vinyl chloride (5 mL, 0.072 mol), solvent (o-DCB, 10 mL), initiator (propanoic acid, 2-iodo-2-methyl-4,4'-biphenylene ester 162 mg, 0.28 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.75 g (38%) of PVC, Mn=6,700, Mw/Mn=1.47.

Table 4, Example 74

A 50 mL Ace Glass 8648 #15 Ace-Thred pressure tube equipped with bushing and plunger valve containing vinyl chloride (5 mL, 0.072 mol), solvent (o-DCB, 10 mL), initiator (1,1,1-tris(4-(2-iodo-2-methylpropanoylphenyl)) ethane 167 mg, 0.19 mmol), catalyst (copper, 72 mg, 1.12 mmol) and ligand (bpy, 350 mg, 2.2 mmol) was degassed by three freeze-vacuum pump-thaw cycles and filled with argon. The reaction mixture was slowly heated to 130° C. in an oil bath. After 70 hours, the tube was slowly cooled and excess vinyl chloride was allowed to boil off. Methylene chloride (10 mL) was added and the solution was precipitated into methanol, filtered and dried to yield 1.7 g (37%) of PVC, Mn=8,600, Mw/Mn=1.67.

Table 4, Example 75

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoperflorodecane 180 mg, 0.28 mmol), catalyst (copper, 25 mg, 0.56 mmol) and ligand (bpy, 175 mg, 1.1 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (26%) of PVC, Mn=5,800, Mw/Mn=1.64.

Table 4, Example 78

A 50 mL Ace Glass 8648 #15 Ace-Thred pressure tube equipped with bushing and plunger valve containing vinyl chloride (5 mL, 0.072 mol), solvent (o-DCB, 10 mL), initiator (allyl iodide 47 mg, 0.28 mmol), catalyst (copper, 36 mg, 0.56 mmol) and ligand (bpy, 175 mg, 1.1 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1 g (22%) of PVC, Mn=6,800, Mw/Mn=1.72.

Table 4, Example 80

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 567 mg, 1.44 mmol), catalyst (copper, 138 mg, 2.11 mmol) and ligand (bpy, 675 mg, 4.3 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.36 g (8%) of PVC, Mn=3.300, Mw/Mn=1.25.

Table 4, Example 80

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 190 mg, 0.48 mmol), catalyst (copper, 184 mg, 2.8 mmol) and ligand (bpy, 900 mg, 5.8 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.45 g (33%) of PVC, Mn=6.100, Mw/Mn=1.65.

Table 4, Example 86

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 18.4 mg, 0.05 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.5 g (11%) of PVC, Mn=30,000, Mw/Mn=1.63.

Table 4, Example 88

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 9.2 mg, 0.02 mmol), catalyst (copper, 18 mg, 0.28 mmol) and ligand (bpy, 87 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.34 g (8%) of PVC, Mn=45,000, Mw/Mn=1.59.

Table 4, Example 89

A 50 mL Ace Glass 8648 #15 Ace-Thred pressure tube equipped with bushing and plunger valve containing vinyl chloride (5 mL, 0.072 mol), solvent (o-DCB, 10 mL), initiator (iodoform, $CHI_3$, 190 mg, 0.48 mmol), catalyst (copper, 23 mg, 0.36 mmol) and ligand (tris(2-aminoethyl) amine (TREN), 52 mg, 0.36 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.45 g (10%) of PVC, Mn=5,000, Mw/Mn=1.58.

Table 4, Example 91

A 50 mL Ace Glass 8648 #15 Ace-Thred pressure tube equipped with bushing and plunger valve containing vinyl chloride (5 mL, 0.072 mol), solvent (o-DCB, 10 mL), initiator (carbon tetraiodide, $CI_4$, 37 mg, 0.07 mmol), catalyst (copper, 37 mg, 0.57 mmol) and ligand (bpy, 180 mg, 1.15 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.29 g (7%) of PVC, Mn=17,400, Mw/Mn= 1.52.

Table 4, Example 97

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 0.66 g (15%) of PVC, Mn=5,200, Mw/Mn=1.78.

Table 4, Example 98

A 50 mL Ace Glass 8648 #15 Ace-Thred pressure tube equipped with bushing and plunger valve containing vinyl chloride (5 mL, 0.072 mol), solvent (o-DCB, 2.5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 1 g (22%) of PVC, Mn=5,600, Mw/Mn=1.77.

Table 4, Example 99

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 1.17 g (26%) of PVC, Mn=6,200, Mw/Mn= 1.78.

Table 4, Example 100

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 60° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (14%) of PVC, Mn=6,500, Mw/Mn= 1.69.

Table 4, Example 101

A 50 mL Ace Glass 8648 #15 Ace-Thred pressure tube equipped with bushing and plunger valve containing vinyl chloride (5 mL, 0.072 mol), initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.81 g (18%) of PVC, Mn=5,400, Mw/Mn=1.87.

Table 4, Example 104

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (14%) of PVC, Mn=6,500, Mw/Mn= 1.69.

Table 4, Example 107

A 50 mL Ace Glass 8648 #15 Ace-Thred pressure tube equipped with bushing and plunger valve containing vinyl chloride (5 mL, 0.072 mol), solvent (o-DCB, 5 mL) initiator (1-iodo-1-chloroethane, 137 mg, 0.72 mmol), catalyst (copper, 92 mg, 1.44 mmol) and ligand (bpy, 450 mg, 2.88 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.95 g (43%) of PVC, Mn=7,100, Mw/Mn= 1.65.

Table 4, Example 109

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 21 mg, 0.072 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.38 g (53%) of PVC, Mn=10,600, Mw/Mn=1.65.

Table 4, Example 110

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.11 g (47%) of PVC, Mn=8,500, Mw/Mn=1.69.

Table 4, Example 111

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 208 mg, 0.72 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.84 g (41%) of PVC, Mn=7,000, Mw/Mn=1.75.

Table 4, Example 112

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 416 mg, 1.44 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.93 g (43%) of PVC, Mn=7,500, Mw/Mn=1.76.

Table 4, Example 112

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 416 mg, 1.44 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 1.93 g (43%) of PVC, Mn=7,500, Mw/Mn=1.76.

Table 4, Example 113

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 830 mg, 2.88 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the mixture was precipitated into methanol, filtered and dried to yield 2.02 g (45%) of PVC, Mn=7,300, Mw/Mn=1.72.

Table 4, Example 114

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 1 hour, the tube was slowly cooled and excess vinyl chloride was allowed to boil off. Methylene chloride (10 mL) was added and the mixture was precipitated into methanol, filtered and dried to yield 1.35 g (30%) of PVC, Mn=4,700, Mw/Mn=1.67.

Table 4, Example 115

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 2 hours, the tube was slowly cooled and excess vinyl chloride was allowed to boil off. Methylene chloride (10 mL) was added and the mixture was precipitated into methanol, filtered and dried to yield 1.49 g (34%) of PVC, Mn=6,200, Mw/Mn=1.71.

Table 4, Example 116

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 4 hours, the tube was slowly cooled and excess vinyl chloride was allowed to boil off. Methylene chloride (10 mL) was added and the mixture was precipitated into methanol, filtered and dried to yield 1.98 g (44%) of PVC, Mn=7,100, Mw/Mn=1.76.

Table 4, Example 117

A 50 mL Ace Glass 8648 #15 Ace-Thred pressure tube equipped with bushing and plunger valve containing vinyl chloride (5 mL, 0.072 mol), deionized water 8 mL), initiator (1-iodo-1-chloroethane, 137 mg, 0.72 mmol), catalyst (copper, 92 mg, 1.44 mmol), ligand (bpy, 450 mg, 2.88 mmol) and surfactant ($CH_3$—$(CH_2)_{11}$—$SO_3Na$, (NaDDS, sodium dodecylsulfate), 104 mg, 0.36 mmol) was degassed by three freeze-vacuum pump-thaw cycles and filled with argon. The reaction mixture was slowly heated to 90° C. in an oil bath. After 8 hours, the tube was slowly cooled and excess vinyl chloride was allowed to boil off. Methylene chloride (10 mL) was added and the mixture was precipitated into methanol, filtered and dried to yield 1.98 g (44%) of PVC, Mn=8,500, Mw/Mn=1.73.

Table 4, Example 118

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 25 mg, 0.07 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.57 g (35%) of PVC, Mn=7,900, Mw/Mn=1.61.

Table 4, Example 119

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 200 mg, 0.56 mmol), catalyst (copper, 143 mg, 2.24 mmol) and ligand (bpy, 700 mg, 4.48 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.48 g (31%) of PVC, Mn=10,300, Mw/Mn=1.58.

Table 4, Example 120

A 50 mL Ace Glass 8648 #15 Ace-Thred pressure tube equipped with bushing and plunger valve containing vinyl chloride (5 mL, 0.072 mol), solvent (ethylene carbonate, 13.2 g, 10 mL), initiator ($\alpha,\alpha'$-diiodo-p-xylene, 100 mg, 0.28 mmol), catalyst (copper, 72 mg, 1.12 mmol) and ligand (bpy, 250 mg, 2.21 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.85 g (19%) of PVC, Mn=8,400, Mw/Mn=1.56.

Table 4, Example 121

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) and ligand (tris[2-(dimethylamino)ethyl]amine (Me$_6$-TREN) 128 mg, 0.56 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.63 g (19%) of PVC, Mn=3,000, Mw/Mn=1.80.

Table 4, Example 122

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 50 mg, 0.14 mmol), catalyst (copper, 36 mg, 0.56 mmol) and (tris(2-aminoethyl)amine (TREN), 164 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the mixture was precipitated into methanol, filtered and dried to yield 1.66 g (37%) of PVC.

Table 4, Example 123

A 50 mL Ace Glass 8648 #15 Ace-Thred pressure tube equipped with bushing and plunger valve containing vinyl chloride (5 mL, 0.072 mol), solvent (dimethylsulfoxide, DMSO, 10 mL), initiator ($\alpha,\alpha'$-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.22 g (5%) of PVC, Mn=3,100, Mw/Mn=2.05.

Table 4, Example 124

A 50 mL Ace Glass 8648 #15 Ace-Thred pressure tube equipped with bushing and plunger valve containing vinyl chloride (5 mL, 0.072 mol), solvent (dimethylformamide, DMF, 10 mL), initiator ($\alpha,\alpha'$-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 22 hours, the tube was slowly cooled and excess vinyl chloride was allowed to boil off. Methylene chloride (10 mL) was added and the solution was precipitated into methanol, filtered and dried to yield 0.8 g (18%) of PVC, Mn=6,100, Mw/Mn=2.02.

Table 4, Example 125

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 1 hour, the tube was slowly cooled and excess vinyl chloride was allowed to boil off. Methylene chloride (10 mL) was added and the solution was precipitated into methanol, filtered and dried to yield 0.07 g (1.5%) of PVC, Mn=1,100, Mw/Mn=1.98.

Table 4, Example 126

A 50 mL Ace Glass 8648 #15 Ace-Thred pressure tube equipped with bushing and plunger valve containing vinyl chloride (5 mL, 0.072 mol), solvent (o-DCB, 10 mL), initiator ($\alpha,\alpha'$-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 2 hours, the tube was slowly cooled and excess vinyl chloride was allowed to boil off. Methylene chloride (10 mL) was added and the solution was precipitated into methanol, filtered and dried to yield 0.3 g (6.6%) of PVC, Mn=4,100, Mw/Mn=1.68.

Table 4, Example 127

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 4 hours, the tube was slowly cooled and excess vinyl chloride was allowed to boil off. Methylene chloride (10 mL) was added and the solution was precipitated into methanol, filtered and dried to yield 0.46 g (11%) of PVC, Mn=7,600, Mw/Mn=1.48.

Table 4, Example 128

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 7 hours, the tube was slowly cooled and excess vinyl chloride was allowed to boil off. Methylene chloride (10 mL) was added and the solution was precipitated into methanol, filtered and dried to yield 0.61 g (13.5%) of PVC, Mn=8,300, Mw/Mn=1.46.

Table 4, Example 129

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 100 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 13 hours, the tube was slowly cooled and excess vinyl chloride was allowed to boil off. Methylene chloride (10 mL) was added and the solution was precipitated into methanol, filtered and dried to yield 0.78 g (17.5%) of PVC, Mn=10,400, Mw/Mn=1.48.

Table 4, Example 130

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 2 hours, the tube was slowly cooled and excess vinyl chloride was allowed to boil off. Methylene chloride (10 mL) was added and the solution was precipitated into methanol, filtered and dried to yield 0.1 g (2.2%) of PVC, Mn=2.100, Mw/Mn=2.10.

Table 4, Example 131

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 5 hours, the tube was slowly cooled and excess vinyl chloride was allowed to boil off. Methylene chloride (10 mL) was added and the solution was precipitated into methanol, filtered and dried to yield 0.34 g (7.5%) of PVC, Mn=7,000, Mw/Mn=1.49.

Table 4, Example 132

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 36 mg, 0.56 mmol) and ligand (bpy, 175 mg, 1.12 mmol) was degassed by three freeze-vacuum pump-thaw cycles and filled with argon. The reaction mixture was slowly heated to 130° C. in an oil bath. After 11 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,000, Mw/Mn=1.45.

Table 4, Example 133

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 36 mg, 0.56 mmol) ligand (bpy, 175 mg, 1.12 mmol) and additive (Al$^i$Bu$_3$, 0.26 mL 1 M in tolene, 0.26 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 0.9 g (20%) of PVC, Mn=12,700, Mw/Mn=1.59.

Table 4, Example 134

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 72 mg, 1.12 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.95 g (21%) of PVC, Mn=29,600, Mw/Mn=1.89.

Table 4, Example 135

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 50 mg, 0.14 mmol), catalyst (copper, 144 mg, 2.24 mmol) and ligand (bpy, 175 mg, 1.12 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the mixture was precipitated into methanol, filtered and dried to yield 1.9 g (42%) of PVC.

Table 4, Example 136

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-diiodo-p-xylene, 25 mg, 0.07 mmol), catalyst (copper, 18 mg, 0.28 mmol), ligand (bpy, 88 mg, 0.56 mmol) and additive (2,6-di-$^t$butylpyridine, 115 mg, 0.56 mmol) was degassed by three freeze-vacuum pump-thaw cycles and filled with argon. The reaction mixture was slowly heated to 130° C. in an oil bath. After 21 hours, the tube was slowly cooled and excess vinyl chloride was allowed to boil off. Methylene chloride (10 mL) was added and the solution was precipitated into methanol, filtered and dried to yield 0.4 g (9%) of PVC, Mn=29,600, Mw/Mn=1.89.

Table 4, Example 139

A 50 mL Ace Glass 8648 #15 Ace-Thred pressure tube equipped with bushing and plunger valve containing vinyl chloride (5 mL, 0.072 mol), solvent (o-DCB, 10 mL), initiator (α,α'-dithiocyanato-p-xylene, 62 mg, 0.28 mmol), catalyst (copper, 72 mg, 1.12 mmol) and ligand (bpy, 350 mg, 2.24 mmol) was degassed by three freeze-vacuum pump-thaw cycles and filled with argon. The reaction mixture was slowly heated to 130° C. in an oil bath. After 20 hours, the tube was slowly cooled and excess vinyl chloride was allowed to boil off. Methylene chloride (10 mL) was added and the solution was precipitated into methanol, filtered and dried to yield 1.2 g (26%) of PVC, Mn=11,000, Mw/Mn=3.14.

Table 5, Example 140

A 50 mL Ace Glass 8648 #15 Ace-Thred pressure tube equipped with bushing and plunger valve containing vinyl chloride (5 mL, 0.072 mol), solvent (xylene, 10 mL), initiator (ethyl 2-bromoisobutyrate, 111 mg, 0.56 mmol), catalyst (aluminium, 20 mg, 0.74 mmol) and ligand (bpy, 100 mg, 0.64 mmol) was degassed by three freeze-vacuum pump-thaw cycles and filled with argon. The reaction mixture was slowly heated to 90° C. in an oil bath. After 17 hours, the tube was slowly cooled and excess vinyl chloride was allowed to boil off. Methylene chloride (10 mL) was added and the solution was precipitated into methanol, filtered and dried to yield 0.31 g (7%) of PVC, Mn=8,200, Mw/Mn=1.61.

Table 5, Example 141

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol) and catalyst (triisobutylaluminium, Al$^i$Bu$_3$, 0.64 mL 1 M in toluene, 0.64 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 1.35 g (30%) of PVC, Mn=8,200, Mw/Mn=1.61.

Table 5, Example 142

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (cadmium, 76 mg, 0.68 mmol) and ligand (bpy, 100 mg, 0.64 mmol) was degassed by three freeze-vacuum pump-thaw cycles and filled with argon. The reaction mixture was slowly heated to 90° C. in an oil bath. After 22 hours, the tube was slowly cooled and excess vinyl chloride was allowed to boil off. Methylene chloride (10 mL) was added and the solution was precipitated into methanol, filtered and dried to yield 0.6 g (14%) of PVC, Mn=14,100, Mw/Mn=1.65.

Table 5, Example 143

A 50 mL Ace Glass 8648 #15 Ace-Thred pressure tube equipped with bushing and plunger valve containing vinyl chloride (5 mL, 0.072 mol), solvent (dioxane, 10 mL), initiator (ethyl 2-bromoisobutyrate, 111 mg, 0.56 mmol), catalyst (samarium, 102 mg, 0.68 mmol) and ligand (bpy, 150 mg, 0.96 mmol) was degassed by three freeze-vacuum pump-thaw cycles and filled with argon. The reaction mixture was slowly heated to 90° C. in an oil bath. After 19 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,400, Mw/Mn=1.64.

Table 4, Example 144

A 50 mL Ace Glass 8648 #15 Ace-Thred pressure tube equipped with bushing and plunger valve containing vinyl chloride (5 mL, 0.072 mol), solvent (o-DCB, 10 mL), initiator (ethyl 2-bromoisobutyrate, 111 mg, 0.56 mmol), catalyst (zinc, 45 mg, 0.69 mmol) and ligand (bpy, 200 mg, 0.96 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.49 g (11%) of PVC, Mn=11,400, Mw/Mn=1.64.

Table 4, Example 145

A 50 mL Ace Glass 8648 #15 Ace-Thred pressure tube equipped with bushing and plunger valve containing vinyl chloride (5 mL, 0.072 mol), solvent (o-DCB, 10 mL), initiator (1-chloro-cyanoethane, 111 mg, 0.56 mmol) and catalyst (chromium hexacarbonyl Cr(CO)$_6$, 150 mg, 0.68 mmol) was degassed by three freeze-vacuum pump-thaw cycles and filled with argon. The reaction mixture was slowly heated to 90° C. in an oil bath. After 20 hours, the tube was slowly cooled and excess vinyl chloride was allowed to boil off. Methylene chloride (10 mL) was added and the solution was precipitated into methanol, filtered and dried to yield 0.4 g (9%) of PVC, Mn=18,400, Mw/Mn=1.57.

Table 6, Example 154

A 50 mL Ace Glass 8648 #15 Ace-Thred pressure tube equipped with bushing and plunger valve containing vinyl chloride (5 mL, 0.072 mol), deionized water 10 mL), initiator (1-iodo-1-chloroethane, 137 mg, 0.72 mmol), catalyst (copper, 92 mg, 1.44 mmol), ligand (TREN, 421 mg, 2.88 mmol) and surfactant ($CH_3$—$(CH_2)_{11}$—$SO_3Na$, NaDDS, sodium dodecylsulfate), 104 mg, 0.36 mmol) was degassed by three freeze-vacuum pump-thaw cycles and filled with argon. The reaction mixture was stirred at 20° C. in an oil bath. After 20 hours, the tube was slowly opened and excess vinyl chloride was allowed to boil off. THF (10 mL) was added and the mixture was precipitated into methanol, filtered and dried to yield 4.3 g (95%) of PVC, Mn=13,200, Mw/Mn=1.54.

Table 6, Example 218

A 50 mL Ace Glass 8648 #15 Ace-Thred pressure tube equipped with bushing and plunger valve containing vinyl chloride (5 mL, 0.072 mol), deionized water 6 mL and THF 4 mL), initiator (iodoform, 284 mg, 0.72 mmol), catalyst (copper telluride, 367 mg, 1.44 mmol), ligand (TREN, 421 mg, 2.88 mmol) and surfactant ($CH_3$—$(CH_2)_{11}$—$SO_3Na$, NaDDS, sodium dodecylsulfate), 63 mg, 0.21 mmol) was degassed by three freeze-vacuum pump-thaw cycles and filled with argon. The reaction mixture was stirred at 20° C. in an oil bath. After 14 hours, the tube was slowly opened and excess vinyl chloride was allowed to boil off. THF (10 mL) was added and mixture was precipitated into methanol, filtered and dried to yield 4.5 g (99%) of PVC, Mn=11,600, Mw/Mn=1.53.

What is claimed is:

1. A polymeric composition comprising:
   a vinyl chlorine polymer derived from a living radical polymerization of a vinyl chloride monomer or a structurally-related derivative thereof in the presence of an initiator, a metal catalyst, an optional ligand and an optional solvent or water.

2. A composition according to claim 1, wherein said vinyl chloride monomer or structurally-related derivative is one or more of vinyl chloride, vinylidene chloride, 2-chloropropine or 2-chloropropene.

3. A composition according to claim 1, wherein said initiator is a halogen containing initiator and said initiator contains one or more of a mono, di, tri or polyfunctional activated halide including $\alpha,\alpha$-dihaloalkane, $\alpha,\alpha,\alpha$-trihaloalkane, a perhaloalkane, a perfloroalkyl halide, a benzyl halide, an allyl halide, a sulfonyl halide, an $\alpha$-haloester, an $\alpha$-halonitrile, a $\alpha$-haloketone, an imidyl halide, or combinations thereof.

4. A composition according to claim 3, wherein said initiator is one or more of chlorine, bromine, iodine or thiocyanate.

5. A composition according to claim 1, wherein said metal catalyst is one or more of a metal in its zero oxidation state, a mixture of two or more metals in their zero oxidation state, a metal salt or complex, a mixture of two or more metal salts or complexes, or a mixture of two or more metals in their zero oxidation state with metal salts or complexes.

6. A composition according to claim 5, wherein said metal is Cu, Fe, Al, Cd, Zn, Zr, Mo, W, Rh, Ir, Pt, Co, Ti, Cr, V, Os, Mn, Ni, Ru, Pd, Ag, Hg, La, Tl, Bi, Pb, Sn, Sm and mixtures thereof.

7. A composition according to claim 6, wherein said catalyst is present in an amount of from about 0.01 to about 10 moles per mole of initiating group in the initiator, and said catalyst is Cu(0), $Cu_2Te$, $CU_2Se$, $Cu_2S$, $Cu_2O$, CuSPh, CuSBu, CuC≡CPh, CuCl, CuBr, CuI, Fe(0) or $TiCp_2Cl_2$.

8. A composition according to claim 6, wherein said initiator is present in an amount from about 10,000 to about 1 moles of vinyl chloride monomer per one mole of initiator and said vinyl chloride monomer is vinyl chloride.

9. A composition according to claim 1, further comprising a ligand, wherein said ligand includes one or more of 2,2'-bipyridyl, 4,4'-di-nonyl-2-2'-bipyridyl, 1,10-phenantroline, pentamethyldiethylenetriamine, tris(2-aminoethyl)amine, tris[2-(dimethylamino)ethyl]amine, triphenylphosphine, triphenylphosphine oxide, acetylacetonate, terpyridine, or carbon monoxide or combinations thereof, and said ligand is present in an amount from about 0.1 to about 10 moles of ligand per mole of catalyst.

10. A composition according to claim 1, further including a comonomer, wherein said comonomer is a monomer known to copolymerize with vinyl chloride via a radical mechanism and said comonomer is one or more of acrylates, vinylidene halides, methacrylates, acrylonitrile, methacrylonitrile, vinyl halides, 2-haloalkenes, styrenes, acrylamide, methacrylamide, vinyl ketones, N-vinylpyrrolidinone, maleic acid esters or combinations thereof, and said comonomer is present in an amount of from about 1% up to about 99%.

11. A composition according to claim 10, wherein said comonomer is vinylidene chloride, 2-chloropropene, acrylonitrile, acrylic acid esters or maleic acid esters and said comonomer is present in an amount from about 1% to about 99%.

12. A composition according to claim 1, comprising vinyl chloride; said initiator is one or more of a mono, di, tri or polyfunctional activated halide including $\alpha,\alpha$-iodohaloalkane, $\alpha,\alpha$-diiodoalkane $\alpha,\alpha,\alpha$-triiodoalkane, $\alpha,\alpha,\alpha$-dihaloiodoalkane a perhaloiodoalkane, carbon tetraiodide, a perfloroalkyl iodide, a benzyl iodide, an allyl iodide an $\alpha$-iodoester, an $\alpha$-iodonitrile, a $\alpha$-iodoketone, and combinations thereof; said metal catalyst is Cu(0), $Cu_2Te$, $Cu_2Se$, $Cu_2S$, $Cu_2O$, CuSPh, CuSBu, CuC≡CPh, CuCl, CuBr, CuI or combinations thereof, and said ligand is bipyridyl or tris(2-aminoethyl)amine or combinations thereof.

13. A composition according to claim 4, wherein said halogen containing initiator is part of a polymer chain, including the chain ends of the said polymer.

14. A composition according to claim 1, wherein the molecular weight distribution of said composition is from about ≦2.0 down to about ≦1.5.

15. A composition according to claim 14, wherein said molecular weight distribution is from about ≦1.5 down to about ≦1.1.

16. A polymeric composition comprising:
   a vinyl chloride polymer derived from a radical polymerization of a vinyl chloride monomer or a structurally-related derivative in the presence of an initiator, a metal catalyst, and optionally ligand and optionally a solvent or water.

17. A composition according to claim 16, wherein said initiator is a halogen-containing initiator and said initiator contains one or more of a mono, di, tri or polyfunctional activated halide including $\alpha,\alpha$-dihaloalkane, $\alpha,\alpha,\alpha$-trihaloalkane, a perhaloalkane, a perfloroalkyl halide, a benzyl halide, an allyl halide, a sulfonyl halide, an $\alpha$-haloester, an imidyl halide, or combinations thereof.

18. A composition according to claim 17, wherein said initiator is one or more of chlorine, bromine, iodine or thiocyanate.

19. A composition according to claim 17, wherein said metal catalyst is one or more of a metal in its zero oxidation state, a mixture of two or more metals in their zero oxidation state, a metal salt or complex, a mixture of two or more metal salts or complexes, or a mixture of two or more metals in their zero oxidation state with metal salts or complexes.

20. A composition according to claim 19, wherein said metal is Cu, Fe, Al, Cd, Zn, Zr, Mo, W, Rh, Ir, Pt, Co, Ti, Cr, V, Os, Mn, Ni, Ru, Pd, Ag, Hg, La, Tl, Bi, Pb, Sn, Sm and mixtures thereof.

21. A composition according to claim 20, wherein said catalyst is present in an amount of from about 0.01 to about 10 moles per mole of initiating group in the initiator, and said catalyst is Cu(0), $Cu_2Te$, $Cu_2Se$, $Cu_2S$, $Cu_2O$, CuSPh, CuSBu, CuC≡CPh, CuCl, CuBr, CuI, Fe(0) or $TiCp_2Cl_2$ and combinations thereof.

22. A composition according to claim 19, wherein said initiator is present in an amount from about 10,000 to about 1 moles of vinyl chloride monomer per one mole of initiator and said vinyl chloride monomer or structurally-related derivative is vinyl chloride, vinylidene chloride or 2-chloropropene.

23. A composition according to claim 16, further comprising a ligand, wherein said ligand includes one or more of 2,2'-bipyridyl, 4,4'-di-nonyl-2-2'-bipyridyl, 1,10-phenantroline pentamethyidiethylenetriamine, tris(2-aminoethyl)amine, tris[2-(dimethylamino)ethyl]amine, triphenylphosphine, triphenylphosphine oxide, acetylacetonate, terpyridine, or carbon monoxide or combinations thereof, and said ligand is present in an amount from about 0.1 to about 10 moles of ligand per mole of catalyst.

24. A composition according to claim 16, further including a comonomer, wherein said comonomer is a monomer known to copolymerize with vinyl chloride or a structurally-related derivative via a radical mechanism, and said comonomer is one or more of acrylates, vinylidene halides, 2-haloalkenes, methacrylates, acrylonitrile, methacrylonitrile, vinyl halides, styrenes, acrylamide, methacrylamide, vinyl ketones, N-vinylpyrrolidinone, maleic acid esters or combinations thereof, and said comonomer is present in an amount of from about 1% up to about 99%.

25. A composition according to claim 24, wherein said comonomer is vinylidene chloride, 2-chloropropene, acrylonitrile, acrylic acid esters or maleic acid esters and said comonomer is present in an amount from about 1% to about 99%.

26. A composition according to claim 23, wherein said vinyl chloride monomer or a structurally-related derivative is vinyl chloride, said initiator is one or more of a mono, di, tri or polyfunctional activated halide including α,α-iodohaloalkane, α,α-diiodoalkane α,α,α-triiodoalkane, α,α, α-dihaloiodoalkane, a perhaloiodoalkane, carbon tetraiodide, a perfloroalkyl iodide, a benzyl iodide, an allyl iodide, an α-iodoester, an α-iodonitrile, an α-iodoketone, or combinations thereof, said metal catalyst is Cu(0), $Cu_2Te$, $Cu_2Se$, $Cu_2S$, $Cu_2O$, CuSPh, CuSBu, CuC≡CPh, CuCl, CuBr, CuI or combinations thereof and said ligand is bipyridyl or tris(2-aminoethyl)amine.

27. A polymeric composition comprising:
a copolymer derived from a radical or a living radical polymerization of vinyl chloride monomer or a structurally-related derivative and a comonomer known to copolymerize with vinyl chloride via a radical mechanism in the presence of an initiator, a metal catalyst, and optionally a ligand and optionally a solvent or water.

28. A composition according to claim 27, wherein said initiator is a halogen-containing initiator and is one or more of a mono, di, tri or polyfunctional activated halide including α-α-dihaloalkane, α-α-α-trihaloalkane, a perhaloalkane, alkyl halide, a perfluoro alkyl halide, a benzyl halide, an aryl halide, a sulfonyl halide, an α-haloester, and α-halonitrile, and α-haloketone, an imidyl halide, or combinations thereof.

29. A composition according to claim 28, wherein said initiator is one or more of chlorine, bromine, iodine or thiocyanate.

30. A composition according to claim 28, wherein said metal catalyst is one or more of metals in their zero oxidation state, a mixture of two or more metals in their zero oxidation state, a metal salt or complex, a mixture of two or more metal salts or complexes, or a mixture of two or more metals in their zero oxidation state with metal salts or complexes.

31. A composition according to claim 30, wherein said metal catalyst is Cu, Fe, Al, Cd, Zn, Zr, Mb, W, Rh, Ir, Co, Ti, Cr, V, Mn, Ni, Ru, Pd, Ag, Pb, Sn, said catalyst is present in an amount of from about 0.25 to about 5 moles per mole of initiator, and said Cl-containing vinyl monomer is vinyl chloride.

32. A composition according to claim 30, further comprising a ligand, wherein said ligand includes one or more of 2,2'-bipyridyl,4,4'di-nonyl-2-2'-bipyridyl, 1,10-phenantroline, pentamethyidiethylenetriamine, tris[2-aminoethyl]amine, tris[2-(dimethylamino)ethyl]amine, triphenyl phosphine, triphenylphosphine oxide, acetyacetone, terpyridine, or carbon monoxide or combinations thereof, and said ligand is present in an amount from about 0.1 to about 10 moles of ligand per mole of catalyst.

33. A composition according to claim 28, further comprising a comonomer, wherein said comonomer is an acrylate, a vinylidene halide, a 2-haloalkene, a methacrylate, an acrylonitrile, a methacrylonitrile, a vinyl halide, a styrene, an acrylamide, a methacrylamide, a vinyl ketone, an N-vinylpyrrolidinone, a maleic acid ester, or combinations thereof, and said comonomer is present in a amount of from about 1% up to about 99%.

34. A composition according to claim 33, wherein said comonomer is vinylidene chloride, acrylonitrile, 2-chloropropene, acrylic acid esters and maleic acid esters and said comonomer is present in amount from about 1% to about 99%.

* * * * *